(12) United States Patent
Watanabe et al.

(10) Patent No.: US 10,969,281 B2
(45) Date of Patent: Apr. 6, 2021

(54) ILLUMINATION APPARATUS

(71) Applicants: OLYMPUS CORPORATION, Hachioji (JP); NIPPON TELEGRAPH AND TELEPHONE CORPORATION, Tokyo (JP)

(72) Inventors: Daichi Watanabe, Tokyo (JP); Kei Watanabe, Tokyo (JP); Yu Kurata, Tokyo (JP); Satomi Katayose, Tokyo (JP); Ryoichi Kasahara, Tokyo (JP)

(73) Assignees: OLYMPUS CORPORATION, Tokyo (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 57 days.

(21) Appl. No.: 16/517,721

(22) Filed: Jul. 22, 2019

(65) Prior Publication Data

US 2019/0339055 A1 Nov. 7, 2019

Related U.S. Application Data

(63) Continuation of application No. PCT/JP2018/002211, filed on Jan. 25, 2018.

(30) Foreign Application Priority Data

Jan. 25, 2017 (JP) .............................. JP2017-011685

(51) Int. Cl.
*G01J 9/02* (2006.01)
*G01B 9/02* (2006.01)
*G01B 11/24* (2006.01)
*G01B 11/25* (2006.01)

(52) U.S. Cl.
CPC .............. *G01J 9/02* (2013.01); *G01B 9/0201* (2013.01); *G01B 9/02007* (2013.01);
(Continued)

(58) Field of Classification Search
CPC .. G01B 11/25; G01B 9/02007; G01B 9/0201; G01B 9/02028; G01B 11/2441; G01B 11/2527; G01J 9/02; G01J 2009/0234
See application file for complete search history.

(56) References Cited

U.S. PATENT DOCUMENTS

2002/0135773 A1* 9/2002 Chen .................. G01B 11/2527
356/495
2010/0225927 A1* 9/2010 Dillon .................... A61C 9/006
356/511
(Continued)

FOREIGN PATENT DOCUMENTS

JP H05087543 A 4/1993
JP 2009134047 A 6/2009
(Continued)

OTHER PUBLICATIONS

International Preliminary Report on Patentability (IPRP) dated Jul. 30, 2019 (and English translation thereof) issued in International Application No. PCT/JP2018/002211.
(Continued)

*Primary Examiner* — Michael A Lyons
(74) *Attorney, Agent, or Firm* — Holtz, Holtz & Volek PC

(57) ABSTRACT

An illumination apparatus generates an interference fringe. An input arm receives an input light beam from a light source. A splitter splits the input light beam that has passed through the input arm into a first output arm and a second output arm. A phase modulator changes a phase difference between the output light beams of the first output arm and the second output arm. A phase detector detects the phase difference between output light beams respectively output from the first output arm and the second output arm based on a return light beam generated by combining a first reflected light beam and a second reflected light beam respectively
(Continued)

reflected by ends of the first output arm and the second output arm.

6 Claims, 18 Drawing Sheets

(52) U.S. Cl.
CPC ...... *G01B 9/02028* (2013.01); *G01B 11/2441* (2013.01); *G01B 11/2527* (2013.01)

(56) References Cited

U.S. PATENT DOCUMENTS

| | | | |
|---|---|---|---|
| 2010/0227291 A1 | 9/2010 | Dillon et al. | |
| 2010/0290060 A1* | 11/2010 | Mohazzab | G01B 11/25 356/492 |
| 2011/0205356 A1* | 8/2011 | Kim | G01B 11/25 348/135 |
| 2011/0299094 A1* | 12/2011 | Dillon | G01B 11/2527 356/603 |

FOREIGN PATENT DOCUMENTS

| | | |
|---|---|---|
| JP | 2016187529 A | 11/2016 |
| JP | 2016198403 A | 12/2016 |

OTHER PUBLICATIONS

International Search Report (ISR) dated Apr. 3, 2018 (and English translation thereof) issued in International Application No. PCT/JP2018/002211.

Chinese Office Action (and English language translation thereof) dated Sep. 3, 2020 issued in Chinese Application No. 201880007755.0.

Zhang, "Research on Key Technologies for Projection Phase Measurement Contour of Optical Fiber Interference =Fringe", Chinese Doctoral Dissertations Full-text Database—Information Science and Technology, May 15, 2013, fifth period, pp. I135-32.

* cited by examiner

ILLUMINATION APPARATUS

BACKGROUND OF THE INVENTION

1. Field of the Invention

The present invention relates to an illumination apparatus.

2. Description of the Related Art

As a method for measuring the three-dimensional shape of a measurement target, a so-called "fringe scanning method" is known. In this technique, a laser interference fringe is projected onto the measurement target, and an image of the projected interference fringe is captured and analyzed so as to calculate the surface peak and bottom information for the measurement target. With the fringe scanning method, the depth of the bottom and the height of the peak are calculated for each point of the projected image based on the scanning amount of the interference fringe and the change in the light intensity for each point of the projected image (see Patent document, Japanese Patent Application Laid Open No. H05-87543, for example).

The interference fringe is generated by an illumination apparatus. The illumination apparatus includes waveguides that provide two paths (arms), an optical coupler that splits a coherent light beam into light beams that propagate through the two respective waveguides, and a phase modulator that provides a difference in the optical length between the two waveguides. By providing interference between the light beams after they pass through the two respective waveguides, the illumination apparatus generates an interference fringe.

The magnitude distribution of the interference fringe is controlled according to the phase difference between the two arms. In three-dimensional shape measurement or structured illumination, the magnitude distribution of the interference fringe functions as an important parameter. However, in order to provide a desired interference fringe, the phase difference between the two arms is required to be controlled with high precision.

SUMMARY OF THE INVENTION

The present invention has been made in view of such a situation. Accordingly, it is an exemplary purpose of an embodiment of the present invention to provide an illumination apparatus that is capable of measuring the phase difference between multiple arms.

An embodiment of the present invention relates to an illumining apparatus structured to generate an interference fringe. The illumination apparatus comprises: an input arm structured to receive an input light beam from a light source; a first output arm; a second output arm; a splitter structured to split the input light beam that has passed through the input arm into the first output arm and the second output arm; a phase modulator structured to change a phase difference between output light beams respectively output from the first output arm and the second output arm; and a phase detector structured to detect the phase difference between the output light beams respectively output from the first output arm and the second output arm based on a return light beam obtained by combining a first reflected light beam reflected by an output end of the first output arm and a second reflected light beam reflected by an output end of the second output arm.

It should be noted that any desired combinations of the aforementioned components or the representation of the present invention may be mutually substituted between a method, apparatus, system, and so forth, which are also effective as an embodiment of the present invention.

DETAILED DESCRIPTION OF THE INVENTION

Figure 1:
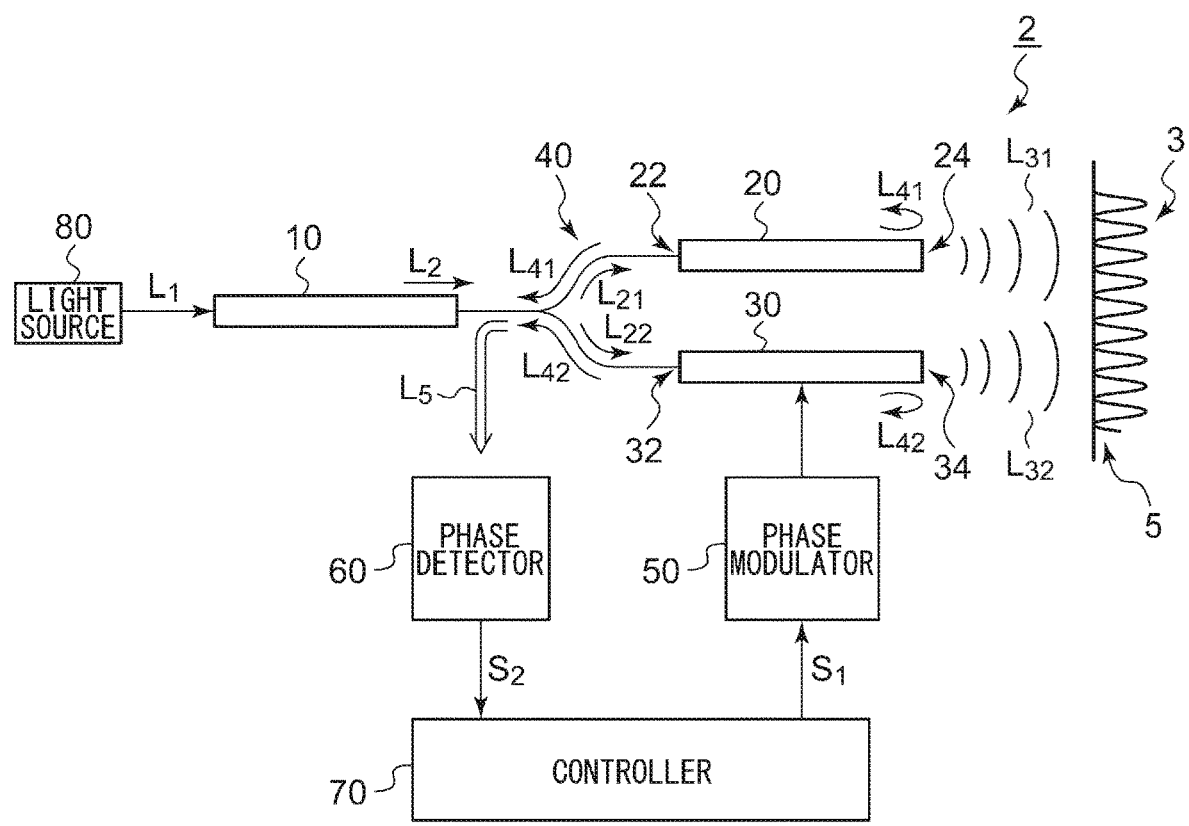
FIG. 1 is a diagram showing a principle of an illumination apparatus that generates an interference fringe.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In some cases, the sizes (thickness, length, width, and the like) of each component shown in the drawings are expanded or reduced as appropriate for ease of understanding. The size relation between multiple components in the drawings does not necessarily match the actual size relation between them. That is to say, even in a case in which a given member A has a thickness that is larger than that of another member B in the drawings, in some cases, in actuality, the member A has a thickness that is smaller than that of the member B.

The vertical axis and the horizontal axis shown in the graphs and the time charts used as references in the present specification are expanded or reduced as appropriate for ease of understanding. Also, each of the graphs and waveforms shown in the drawings are simplified or exaggerated for emphasis or ease of understanding.

OVERVIEW AND PRINCIPLE

FIG. 1 is diagram showing a principle of an illumination apparatus 2 that generates an interference fringe. The illumination apparatus 2 generates an interference fringe 3. The illumination apparatus 2 includes an input arm 10, a first output arm 20, a second output arm 30, a splitter 40, a phase modulator 50, a phase detector 60, a controller 70, and a light source 80.

The input arm 10, the first output arm 20, and the second output arm 30 may each be configured as an optical waveguide, optical fiber, or a combination thereof.

An input light beam $L_1$ is input to the input arm 10 from the light source 80. The input light beam $L_1$ is a coherent light beam. Examples that can be used as the light source 80 include a semiconductor laser, a gas laser, a solid-state laser, an LED (light-emitting diode), and the like. The wavelength of the input light beam $L_1$ is not restricted in particular.

The splitter 40 splits the input light beam $L_2$ that has passed through the input arm 10 into light beams to be input to an input end 22 of the first output arm 20 and an input end 32 of the second output arm 30. The light beam $L_{21}$ input to the input end 22 of the first output arm 20 propagates through the first output arm 20, and is emitted from an output end 24. Similarly, the light beam $L_{22}$ input to the input end 32 of the second output arm 30 propagates through the second output arm 30, and is emitted from the output end 34. By generating interference between the output light beam $L_{31}$ emitted from the output end 24 and the output light beam $L_{32}$ emitted from the output end 34, this arrangement generates an interference fringe 3 on a virtual screen 5.

The phase modulator 50 modulates at least one from among the light path lengths of the output arm 20 and the second output arm 30. This provides a phase difference $\Delta\phi$ between the two output light beams $L_{31}$ and $L_{32}$ respectively output from the first output arm 20 and the second output arm 30. This generates an interference fringe 3 according to the phase difference $\Delta\phi$. The controller 70 controls the phase difference $\Delta\phi$ so as to generate a desired interference fringe 3.

Next, description will be made regarding the phase detection. A part of the light beam $L_{21}$ input to the first output arm 20 is reflected from the output end 24 instead of being emitted, which returns it to the input end 22. This light beam that returns to the input end 22 will be referred to as a "first reflected light beam $L_{41}$". Similarly, a part of the light beam $L_{31}$ input to the second output arm 30 is reflected from the output end 34 instead of being emitted, which returns it to the input end 32. Such a light beam will be referred to as a "second reflected light beam $L_{42}$".

The phase detector 60 detects the phase difference $\Delta\phi$ between the output light beams $L_{31}$ and $L_{32}$ based on a return light beam $L_5$ obtained by combining the first reflected light beam $L_{41}$ and the second reflected light beam $L_{42}$.

The above is the basic configuration of the illumination apparatus 2. Next, description will be made regarding the principle of the phase detection.

The first reflected light beam $L_{41}$ and the second reflected light beam $L_{42}$ each make a single return trip through the corresponding output arm. Accordingly, the phase difference between the first reflected light beam $L_{41}$ and the second reflected light beam $L_{42}$ at the input end is represented by $2\Delta\phi$. The intensity I of the return light beam $L_5$ is represented by the following Expression (1). Here, $I_0$ represents the peak intensity of the return light beam $L_5$.

$$I = I_0 \cdot \cos^2(\Delta\phi) = I_0/2 \times (1+\cos(2\Delta\phi)) \qquad 1$$

Figure 2:
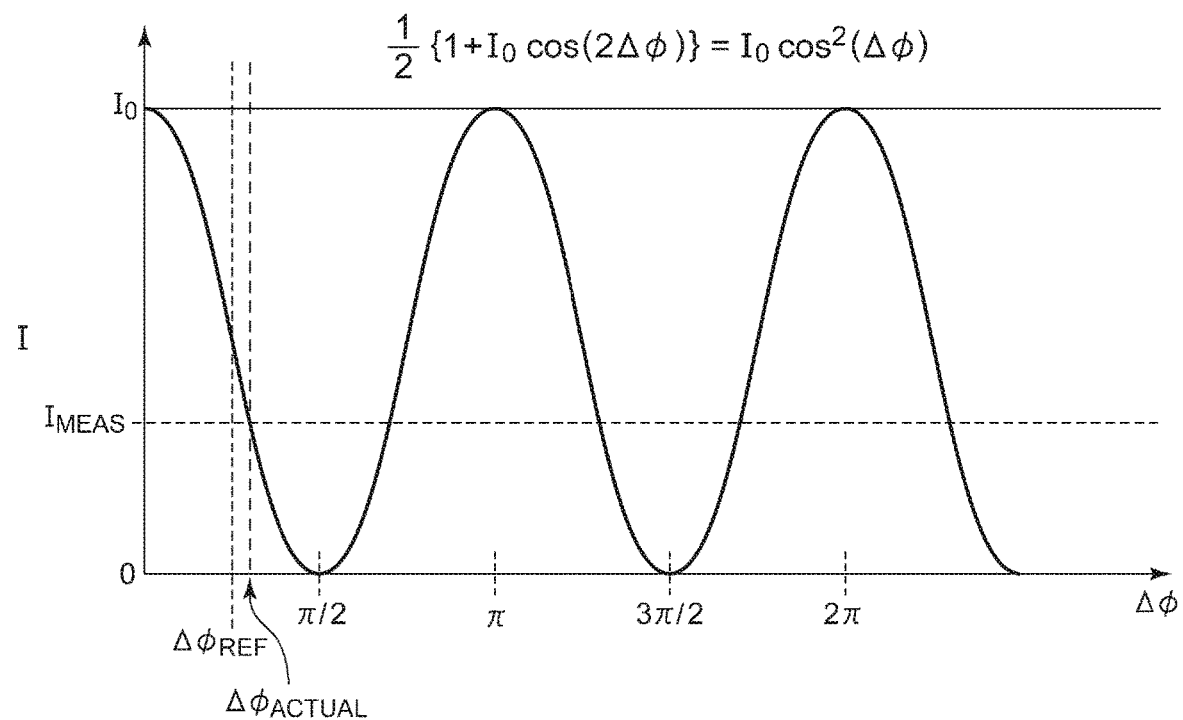
FIG. 2 is a diagram showing the relation between the phase difference $\Delta\phi$ and the intensity I of the return light.

FIG. 2 is a diagram showing the relation between the phase difference $\Delta\phi$ and the intensity I of the return light beam $L_5$. Accordingly, by measuring the intensity I of the return light beam $L_5$, the phase difference $\Delta\phi$ can be measured.

Description will be made regarding the calibration operation of the illumination apparatus 2. The controller 70 supplies, to the phase modulator 50, a control signal $S_1$ corresponding to a desired phase difference $\Delta\phi_{REF}$ (e.g., $\pi/4$). The phase modulator 50 generates the phase difference $\Delta\phi$ between the first output arm 20 and the second output arm 30 according to the control signal $S_1$.

In this case, with the intensity of the return light beam $L_5$ measured by the phase detector 60 as $I_{MEAS}$, an actual phase difference $\Delta\phi_{ACTUAL}$ between the first output arm 20 and the second output arm 30 can be derived from the following Expression (2A) or otherwise (2B).

$$\Delta\phi_{ACTUAL} = \arccos(\sqrt{(I_{MEAS}/I_0)}) \qquad (2A)$$

$$\Delta\phi_{ACTUAL} = \{\arccos(2I_{MEAS}/I_0-1)\}/2 \qquad (2B)$$

As the peak intensity $I_0$, a predetermined value may be employed. Alternatively, the peak intensity $I_0$ may be acquired based on actual measurement.

(i) For example, the intensity I of the return light beam $L_5$ may be measured while continuously or otherwise discretely sweeping the phase difference $\Delta\phi$. The peak intensity $I_0$ may be calculated based on an average value of the intensity I.

(ii) The maximum value may be detected from the intensity I acquired while sweeping the phase difference $\Delta\phi$.

(iii) The phase difference $\Delta\phi$ may be switched between at least three known points. The measurement values of the intensity I at the measurement points may be fitted to the Expression (1) so as to calculate the peak intensity $I_0$.

The above is the calibration operation of the illumination apparatus 2. With the illumination apparatus 2, the actual phase difference $\Delta\phi$ between the output ends 24 and 34 of the first output arm 20 and the second output arm 30 can be measured.

It should be noted that the calibration operation may be made for multiple points (target phase differences $\Delta\phi_{REF}$).

As described above, the phase difference between the two reflected light beams $L_{41}$ and $L_{42}$ included in the return light beam $L_5$ is double the phase difference $\Delta\phi$ between the output ends 24 and 34. That is to say, with the phase detection based on the intensity of the return light beam $L_5$, such an arrangement provides double the detection sensitivity compared to an arrangement in which the phase difference is detected between the output ends.

FEEDBACK CONTROL OPERATION

The phase difference $\Delta\phi_{ACTUAL}$ thus measured can be used as follows, for example. The controller 70 may feedback control the control signal $S_1$ such that the phase difference $\Delta\phi_{ACTUAL}$ thus measured matches the target phase $\Delta\phi_{REF}$. As the feedback control operation, a PI (proportional-integral) control operation or a PID (proportional-integral-differential) control operation may be employed. Alternatively, a feedback system may be configured as an analog circuit employing an error amplifier. This allows the phase difference between the output ends 24 and 34 to be set to the target phase difference $\Delta\phi_{REF}$.

It should be noted that, instead of supporting such a feedback control operation, the calibration may be supported in a software manner by means of image processing using the phase difference $\Delta\phi_{ACTUAL}$ thus measured.

OFFSET OPERATION

Description has been made above with reference to FIG. 2 assuming that there is no offset component in the intensity of the return light beam $L_2$. In actuality, in some cases, the return light beam $L_2$ includes an offset component. Such an offset component occurs due to a design error or a manufacturing error of the splitter or the return light beam splitter, a dark current that occurs in a photodetector that measures the intensity of the return light beam $L_2$, etc. The intensity of the return light beam $L_2$ including the offset component is represented by the following Expression (1a).

$$I = I_0 \cdot \cos^2(\Delta\phi) + I_{DC} \qquad (1a)$$
$$= I_0/2 \times (1 + \cos(2\Delta\phi)) + I_{DC}$$

In this case, the maximum value $I_{MAX}$ and the minimum value $I_{MIN}$ of the intensity I of the return light beam $L_2$ may preferably be measured while scanning the phase difference $\Delta\phi$. Furthermore, with $I_{DC}=I_{MIN}$, and with $I_0=I_{MAX}-I_{MIN}$, the offset component is removed from the intensity I thus measured so as to derive the Expression (1) format. This allows the operation to be the same as that in a case in which there is no offset component. Alternatively, as the maximum value $I_{MAX}$ and the minimum value $I_{MIN}$, values (measurement values, calculated values, assumption values) acquired beforehand may be employed.

WOBBLING PROCESSING

Figure 3:
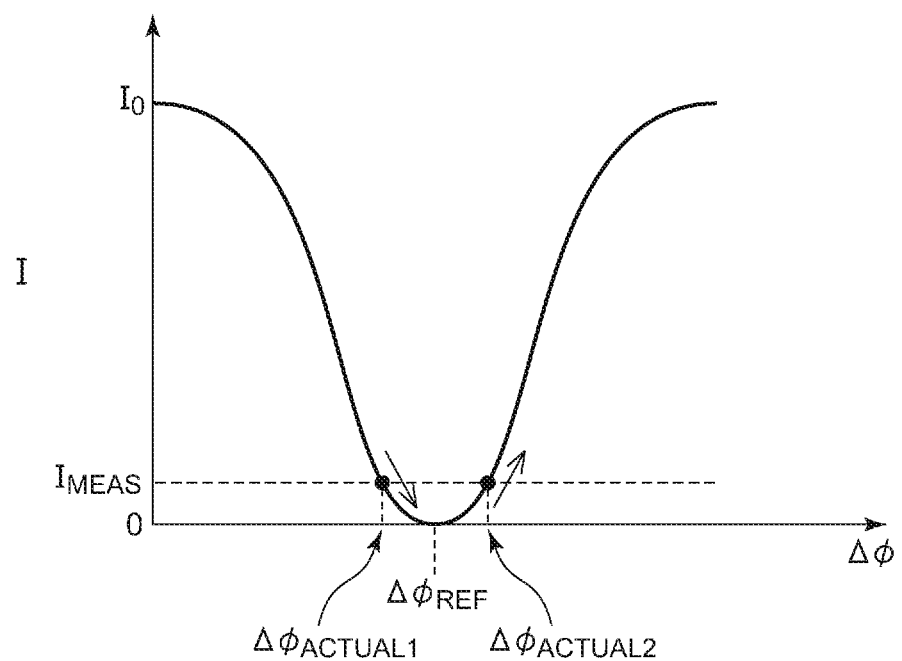
FIG. 3 is a diagram for explaining wobbling processing.

FIG. 3 is a diagram for explaining wobbling processing. As can be clearly understood from FIG. 2, there are multiple phase differences $\Delta\phi$ that provide the same measurement value $I_{MEAS}$. In a case in which an error between the target value $\Delta\phi_{REF}$ and the measurement value $\Delta\phi_{ACTUAL}$ does not exceed an allowable level, and in a case in which the target phase $\Delta\phi_{REF}$ is set to the vicinity of $\pi/4$, $3\pi/4$, $5\pi/4$, $7\pi/4$, ..., the phase difference that is close to the target phase $\Delta\phi_{REF}$ may preferably selected as $\Delta\phi_{ACTUAL}$ from among multiple candidates thereof.

However, as shown in FIG. 3, in a case in which the target phase difference is set to a value in the vicinity of $\Delta\phi=0$, $\pi/2$, $\pi$, $3\pi/2$, $2\pi$, ..., there are multiple candidates for the phase difference $\Delta\phi_{ACTUAL}$ with the target phase difference $\Delta\phi_{REF}$ interposed between them positioned closely to each other. Accordingly, a correct phase difference cannot be selected. That is to say, the detectable phase difference range is narrower than $\pi/2$.

In order to solve such a problem, the controller 70 may change the target phase $\Delta\phi_{REF}$ in a predetermined direction. With such an arrangement, the phase difference $\Delta\phi_{ACTUAL}$ can be selected based on the direction in which the measured intensity $I_{MEAS}$ changes according to the change in the target phase difference $\Delta\phi_{REF}$. For example, in an example shown in FIG. 3, when the measured intensity $I_{MEAS}$ decreases according to an increase in the target phase difference $\Delta\phi_{REF}$ by a predetermined width $\alpha$, $\Delta\phi_{ACTUAL1}$ is selected as a correct phase difference. In contrast, when the measured intensity $I_{MEAS}$ increases according to an increase in the target phase difference $\Delta\phi_{REF}$, $\Delta\phi_{ACTUAL2}$ is selected as the correct phase difference.

Conversely, when the measurement intensity $I_{MEAS}$ increases according to a reduction in $\Delta\phi_{REF}$, $\Delta\phi_{ACTUAL1}$ is selected as the correct phase difference. In contrast, when the measurement intensity $I_{MEAS}$ decreases according to a reduction in $\Delta\phi_{REF}$, $\Delta\phi_{ACTUAL2}$ is selected as the correct phase difference.

As described above, by providing the wobbling processing in the calibration, this arrangement is capable of selecting a suitable one from among multiple candidates for the phase difference $\Delta\phi_{ACTUAL}$. In other words, this arrangement is capable of extending the detectable phase difference range to $\pi$ from $\pi/2$ supported by an arrangement that does not support the wobbling processing.

The present invention encompasses various kinds of apparatuses and methods that can be regarded as a block configuration shown in FIG. 1, or otherwise that can be derived from the aforementioned description. That is to say, the present invention is not restricted to a specific configuration. More specific description will be made below regarding examples and modifications for clarification and ease of understanding of the essence of the present invention and the circuit operation. That is to say, the following description will by no means be intended to restrict the technical scope of the present invention.

Description will be made below regarding several examples in which the illumination apparatus 2 is employed in an endoscope.

FIRST EXAMPLE

Figure 4:
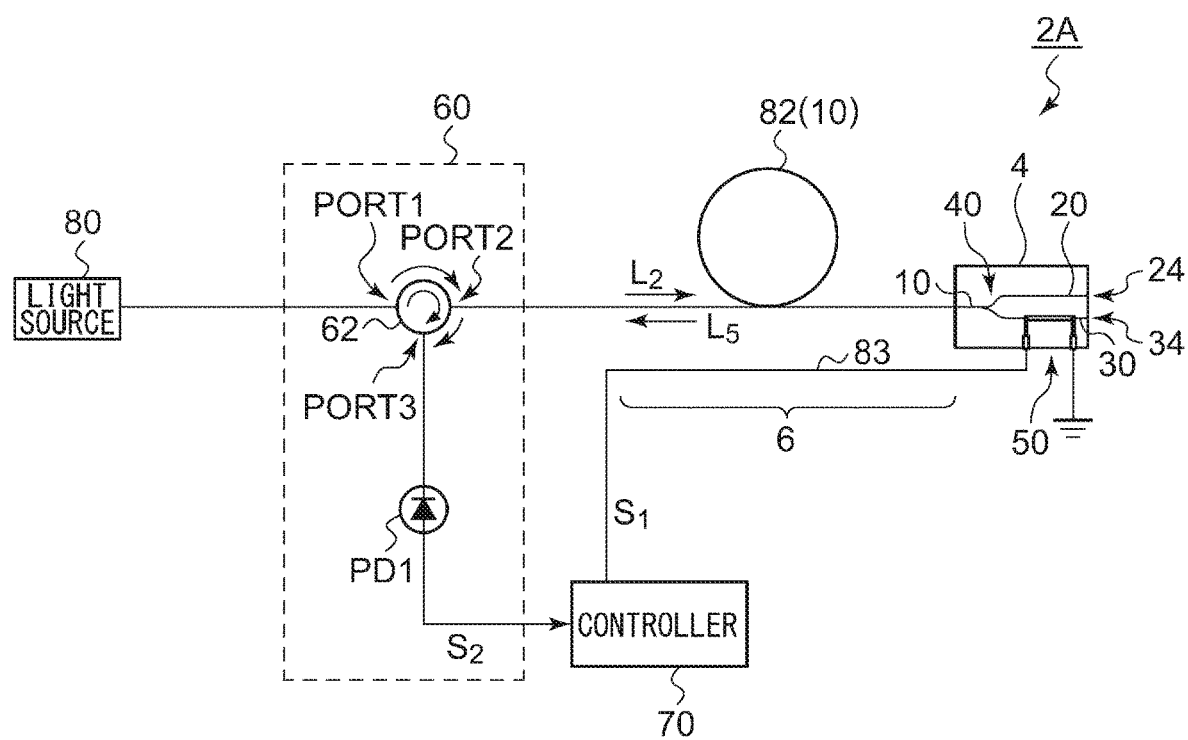
FIG. 4 is a diagram showing an illumination apparatus according to a first example.

FIG. 4 is a diagram showing an illumination apparatus 2A according to a first example. Functionally, an endoscope includes an illumination apparatus that radiates light to an observation target and an image acquisition apparatus that measures the light reflected by the observation target. In three-dimensional shape measurement, the illumination apparatus radiates an interference fringe to the target, and multiple images are acquired while shifting the interference fringe. The three-dimensional shape of the target is reconstructed by means of calculation. In this usage, the illumination apparatus is also referred to as an "interference fringe projector". Such an endoscope is used in the medical field or the industrial field. However, the usage of the endoscope is not restricted to such fields.

Structurally, the endoscope includes an end portion 4 and an insertion portion 6. The end portion 4 is configured as a portion having an outer face formed of a hard material such as metal that houses a part of the illumination apparatus and the image acquisition apparatus. The insertion portion 6 is configured as a flexible member. By bending a portion of the insertion portion 6 that is in the vicinity of the end portion 4, this arrangement is capable of adjusting the direction of the end portion 4. Accordingly, the endoscope is configured as a flexible endoscope including the end portion 4 having lower flexibility than that of the insertion portion 6. An optical fiber 82, wiring 83, etc., are inserted into the internal space of the insertion portion 6. Also, a modification may be made in which the endoscope is configured as a hard endoscope provided with the insertion portion 6 having no flexibility.

In the illumination apparatus 2A, the end portion 4 houses the first output arm 20, the second output arm 30, and the splitter 40, together with an unshown image acquisition apparatus. The output light beam emitted from the light source 80 is input to the end portion 4 via the optical fiber 82 inserted into the internal space of the insertion portion 6 of the endoscope. The optical fiber 82 may be configured as a part of the input arm 10.

Figure 5:
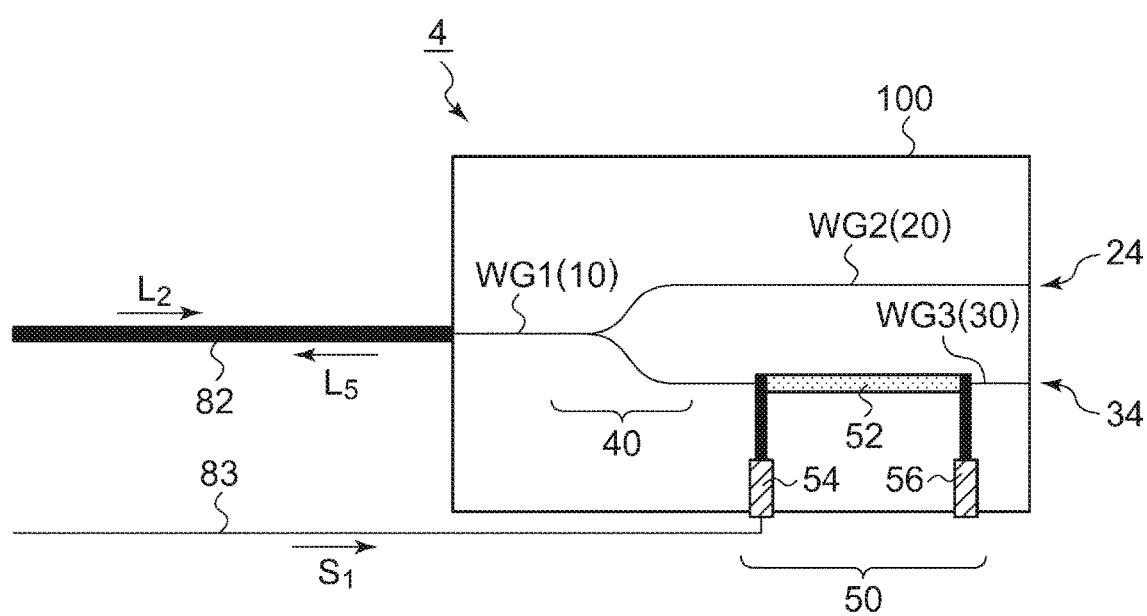
FIG. 5 is a plan view showing a part of an end portion.

Description will be made regarding a configuration of the end portion 4. FIG. 5 is a plan view showing a part of the end portion 4. A part of the end portion 4 is integrated on an optical integrated circuit 100. Specifically, the optical integrated circuit 100 is configured as a silica-type planar lightwave circuit (PLC) on which waveguides WG1, WG2, and WG3, and the splitter 40 are formed. The waveguides WG1, WG2, and WG3 correspond to the input arm 10, the first output arm 20, and a part of (or otherwise all of) the second output arm 30, respectively. The end of the waveguide WG2 corresponds to the output end 24 of the first output arm 20. The end of the waveguide WG3 corresponds to the output end 34 of the second output arm 30.

The waveguide WG1 is coupled with the optical fiber 82 such that the input light beam $L_2$ is input from the light source 80. The splitter 40 is configured as a Y-splitter waveguide configured to split the light beam $L_1$ that propagates through the waveguide WG1 on the input side into light beams that propagate through the two waveguides WG2 and WG3 on the output side. The split ratio supported by the splitter 40 is designed as desired. However, the splitter 40 is preferably designed to have a split ratio of 1:1 so as to provide an interference fringe with a high contrast ratio. In addition, examples of devices to be employed as the splitter 40 include directional couplers having a light distribution function, MMI couplers, star couplers, and the like.

The light source 80 is configured as a solid-state laser light source such as a semiconductor laser element. The output wavelength supported by the light source 80 is not restricted in particular. For example, a red light beam having a wavelength $\lambda$=635 nm may be employed.

At least one from among the waveguides WG2 and WG3 is configured to have a variable optical path length (i.e., refractive index). The phase modulator 50 changes the optical path length of the waveguide WG3 using the thermo-optic effect. The phase modulator 50 includes a thin-film heater 52 and electrodes 54 and 56. The thin-film heater 52 is formed on an upper portion of at least one from among the waveguides WG2 and WG3 (in this example, the waveguide WG3). The thin-film heater 52 may be configured of a metal material such as Cr (chromium) or the like. The electrodes 54 and 56 are drawn from both ends of the thin-film heater 52, which allows electric power to be supplied from an external source. The controller 70 supplies a voltage signal or a current signal as the control signal $S_1$ across the electrodes 54 and 56. This arrangement allows the thin-film heater 52 to generate heat according to the control signal $S_1$, so as to change the refractive index of the waveguide WG3 arranged immediately below the thin-film heater 52 by means of the thermo-optic effect.

A modification may be made in which the phase modulator 50 is configured using the electro-optic effect, carrier plasma dispersion effect, photo-elastic effect, or the like.

Returning to FIG. 4, the phase detector 60 includes a return light beam splitter unit 62 and a first photodetector PD1. In an example, the return light beam splitter unit 62 is configured as an optical circulator including ports PORT1 through PORT3. The first port PORT1 is coupled to the light source 80. The second port PORT2 is coupled to the input arm 10. The return light beam splitter unit 62 outputs, via its second port PORT2, the input light beam input from the light source 80 to the first port PORT1. The return light beam $L_5$ that returns from the first output arm 20 and the second output arm 30 is input to the second port P2 of the return light beam splitter unit 62. The return light beam splitter unit 62 outputs, via its third port PORT3, the return light beam $L_5$ input to the second port P2. In a case in which the return light beam splitter unit 62 is configured as an optical circulator, this arrangement is capable of preventing the return light beam input to the second port PORT2 from returning to the light source 80 on the first port PORT1 side.

The first photodetector PD1 measures the intensity of the output light beam $L_5$ output from the third port PORT3 of the return light beam splitter unit 62. The output $S_2$ of the first photodetector PD1 is input to the controller 70. The controller 70 is capable of calculating the phase difference $\Delta\phi_{ACTUAL}$ based on the intensity I of the return light beam $L_5$ indicated by the output $S_2$ of the first photodetector PD1.

The above is the configuration of the illumination apparatus 2A according to the first example. With the first example, by employing the return light beam splitter unit 62, this arrangement is capable of measuring the intensity of the return light beam $L_5$ so as to detect the phase difference $\Delta\phi$ between the two arms 20 and 30 that are closer to the end side than the splitter 40.

Furthermore, the first example has an advantage of requiring only a single optical fiber 82 to be inserted into the insertion portion 6. The reduction in the number of components greatly contributes to improved reliability.

Figure 6:
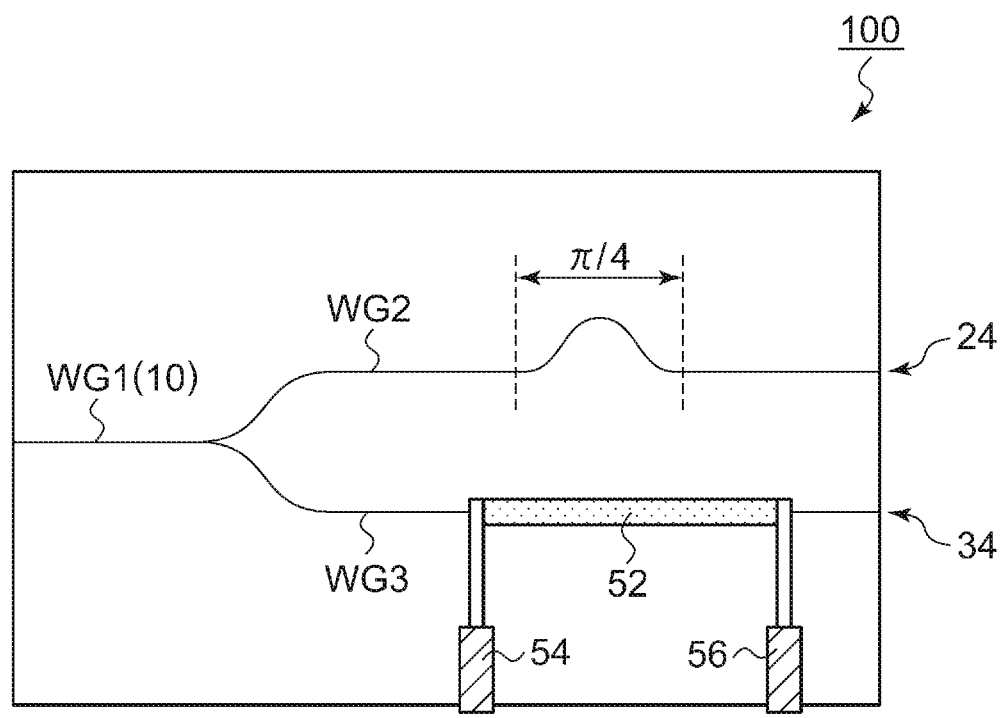
FIG. 6 is a plan view showing an optical integrated circuit according to a modification.

FIG. 6 is a plan view of the optical integrated circuit 100 according to a modification. In this modification, the waveguides WG2 and WG3 are formed on the output side such that they provide an initial phase difference that corresponds to $\pi/4$. FIG. 6 shows a schematic configuration in which the waveguide WG2 has a physical length that is longer than that of the waveguide WG3. However, the present invention is not restricted to such an arrangement. Also, an arrangement may be configured to have a difference in the refractive index so as to provide the optical path difference.

The advantages of the optical integrated circuit 100 shown in FIG. 6 can be clearly understood in comparison with the optical integrated circuit 100 shown in FIG. 5. First, description will be made with reference to FIG. 2 regarding the problems involved in the optical integrated circuit 100 shown in FIG. 5. In the three-dimensional shape measurement, the phase difference between the two output arms is switched between multiple values. Description will be made regarding an example in which four data buckets are employed with 0, $\pi/2$, $\pi$, and $3\pi/2$ (0°, 90°, 180°, 270°) as the four phase difference $\Delta\phi$. In this case, as shown in FIG. 2, the intensity of the return light beam $L_5$ to be measured is in the vicinity of the peak value $I_0$ or otherwise zero, and accordingly, it exhibits a curve with a small slope. That is to say, measurement is made in a low detection sensitivity range. In this case, the detection sensitivity can be regarded as a ratio $dI/d\Delta\phi$ of the change dI in the intensity I with respect to the change $d\Delta\phi$ of the phase difference $\Delta\phi$. Furthermore, in some cases, such an arrangement involves an increase in the necessity of the above-described wobbling processing.

Figure 7:
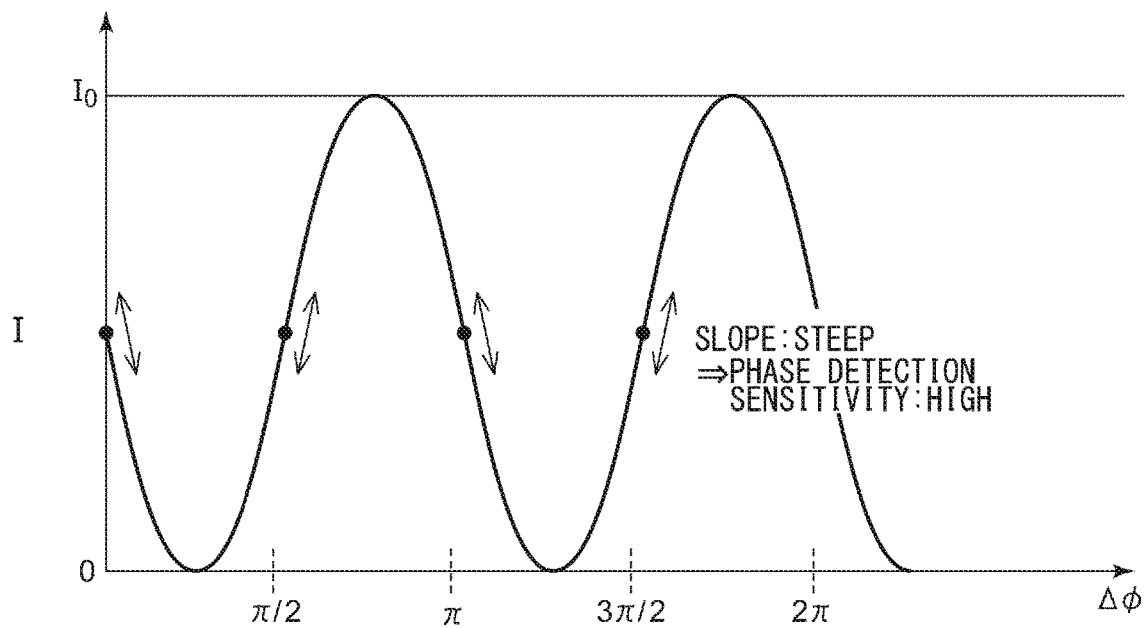
FIG. 7 is a diagram showing the relation between the phase difference $\Delta\phi$ and the intensity I of the return light beam in the optical integrated circuit shown in FIG. 6.

FIG. 7 is a diagram showing the relation between the phase difference $\Delta\phi$ and the intensity I of the return light beam $L_5$ in the optical integrated circuit 100 shown in FIG. 6. By providing the two output arms 20 and 30 with an optical path difference, the relation between the phase difference $\Delta\phi$ and the intensity I is shifted by $\pi/4$ compared to that shown in FIG. 2. In the measurement with the phase difference $\Delta\phi=0$, $\pi/2$, $\pi$, and $3\pi/2$ (0°, 90°, 180°, 270°), this arrangement is capable of measuring the actual phase difference $\Delta\phi_{ACTUAL}$ in a high detection sensitivity range (range in which the intensity I has a large slope).

It should be noted that the modification shown in FIG. 6 is not restricted to the first example. Also, the modification shown in FIG. 6 may be combined with various examples as described below.

SECOND EXAMPLE

Figure 8A:
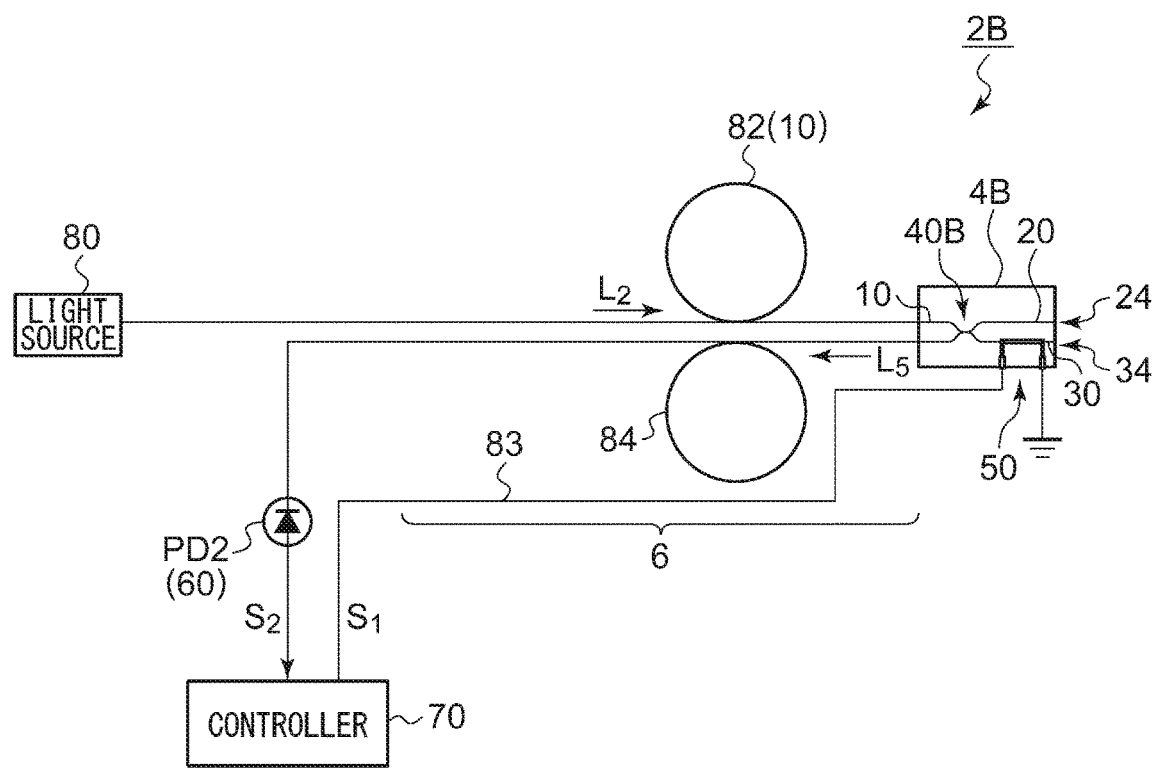
FIGS. 8A ands 8B are diagrams showing an illumination apparatus according to a second example.
Figure 8B:
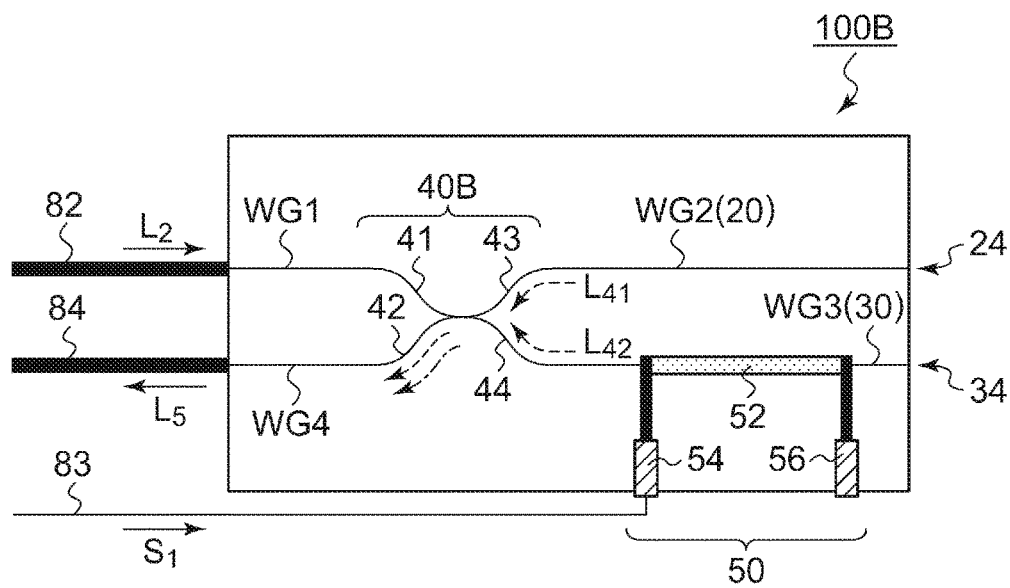

FIGS. 8A and 8B are diagrams showing an illumination apparatus 2B according to a second example. Description has been made in the first example regarding an arrangement in which the return light beam $L_5$ is returned to the first photodetector PD1 using the optical fiber 82 shared by the input light beam $L_2$. In contrast, in the second example, the return light beam $L_5$ is returned via another optical fiber 84 that differs from that via which the input light beam $L_2$ propagates. The optical fiber 84 is housed in the insertion portion 6 together with the optical fiber 82.

FIG. 8B is a plan view of an optical integrated circuit 100B according to the second example. A splitter 40B is configured as a (2×2) optical coupler including a first input path 41, a second input path 42, a first output path 43, and a second output path 44. The first input path 41 is coupled to the input-side waveguide WG1 that corresponds to the input arm 10. The first output path 43 is coupled to the waveguide WG2 that corresponds to the first output arm 20. The second output path 44 is coupled to the waveguide WG3 that corresponds to the second output arm 30. The second input path 42 is coupled to the optical fiber 84 via the waveguide WG4.

The splitter 40B splits the light beam input to the first input path 41 into light beams that propagate through the first output path 43 and the second output path 44. Furthermore, the splitter 40B splits (distributes) the light beams input to the first output path 43 and the second output path 44 into the second input path 42 (and the first input path 41).

A part of the reflected light beams $L_{41}$ and $L_{42}$ that propagate through the first output arm 20 and the second output arm 30 is distributed to the waveguide WG4, and is input to the optical fiber 84. The phase detector 60 measures the intensity of the return light beam $L_5$ returned via the optical fiber 84.

The above is the configuration of the illumination apparatus 2B. In the illumination apparatus 2B, the splitter 40B can be regarded as a combination of the return light beam splitter unit 62 and the splitter 40 monolithically integrated. The illumination apparatus 2B does not require the return light beam splitter unit 62 shown in FIG. 4. The light energy that can be supplied to the end portion 4B is limited by the return light beam splitter unit 62. With the illumination apparatus 2B, this arrangement is capable of supplying a large amount of energy without this limitation. Furthermore, typically, optical fibers require low costs compared to optical circulators. Accordingly, this arrangement contributes to a low-cost configuration.

THIRD EXAMPLE

Figure 9A:
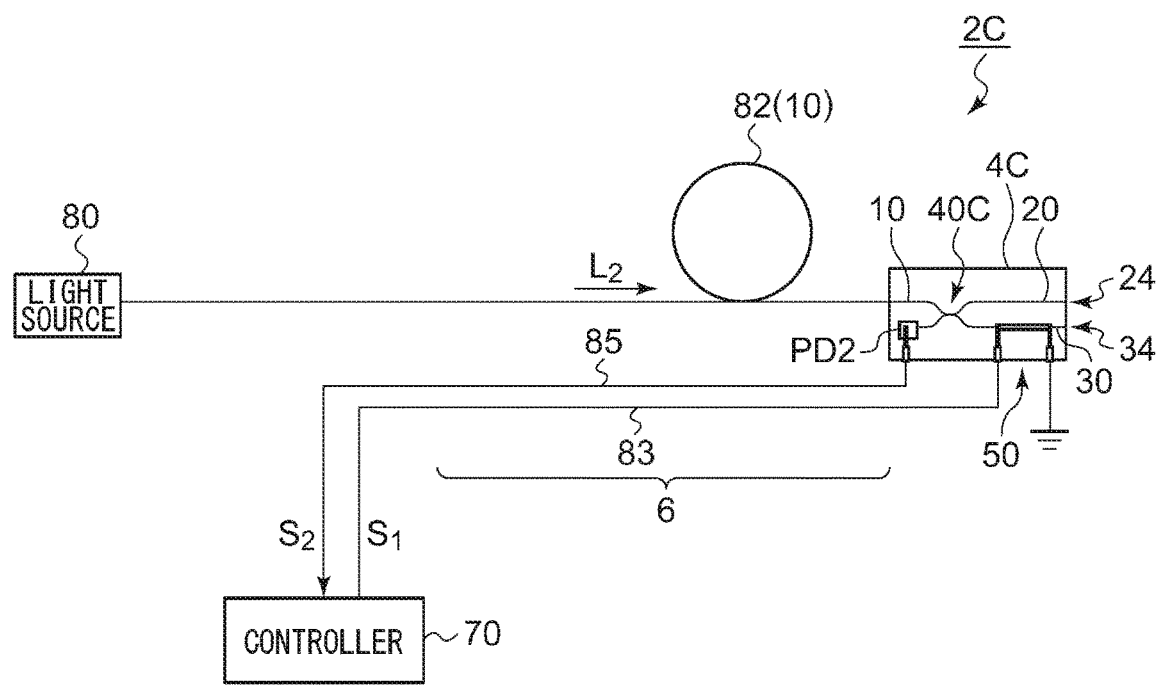
FIGS. 9A ands 9B are diagrams showing an illumination apparatus according to a third example.
Figure 9B:
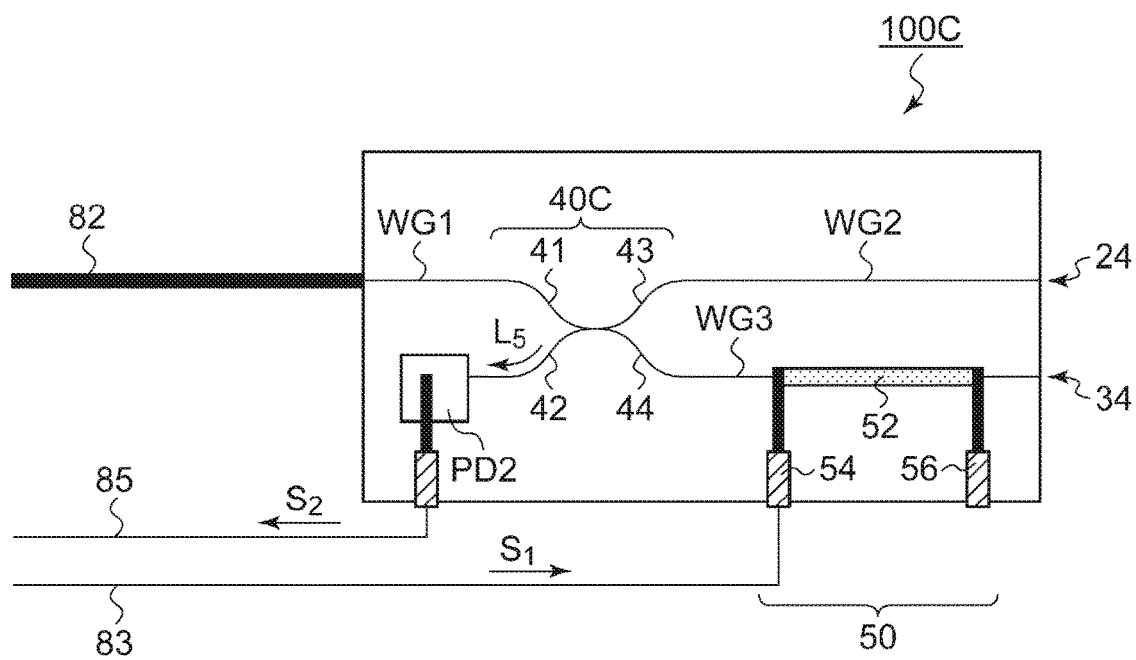

FIGS. 9A and 9B are diagrams showing an illumination apparatus 2C according to a third example. In the third example, the second photodetector PD2 is provided to the end portion 4C. Instead of the optical fiber 84 shown in FIG. 8A, wiring 85 that transmits the output signal $S_2$ of the second photodetector PD2 is inserted into the internal space of the insertion portion 6.

FIG. 9B is a plan view of an optical integrated circuit 100C. The splitter 40C is configured as a (2×2) optical coupler as with the splitter 40B shown in FIG. 8B. The second photodetector PD2 is integrated on the optical integrated circuit 100C. The return light beam $L_5$ output from the second input path 42 is input to the second photodetector PD2. The output signal $S_2$ of the second photodetector PD2 is input to the controller 70 via the wiring 85.

The above is the configuration of the illumination apparatus 2C. With the third example, this arrangement does not require the optical fiber 84 compared to the second example (FIG. 8). Typically, the electrical wiring 85 can be provided at low costs compared to optical fibers. Accordingly, this arrangement contributes to a low-cost configuration. Furthermore, when an optical fiber is bent, this changes the propagation loss of the optical fiber. With the second example (FIG. 8), the return light beam $L_5$ propagates through the optical fiber 84. Accordingly, the optical fiber 84 thus bent has an effect on the intensity of the return light beam $L_5$ to be measured by the second photodetector PD2. In contrast, with the third example, the intensity I of the return light beam $L_5$ is measured at the optical integrated circuit 100C (end portion 4C). Accordingly, there is almost no effect due to such a bent optical fiber.

FOURTH EXAMPLE

Figure 10:
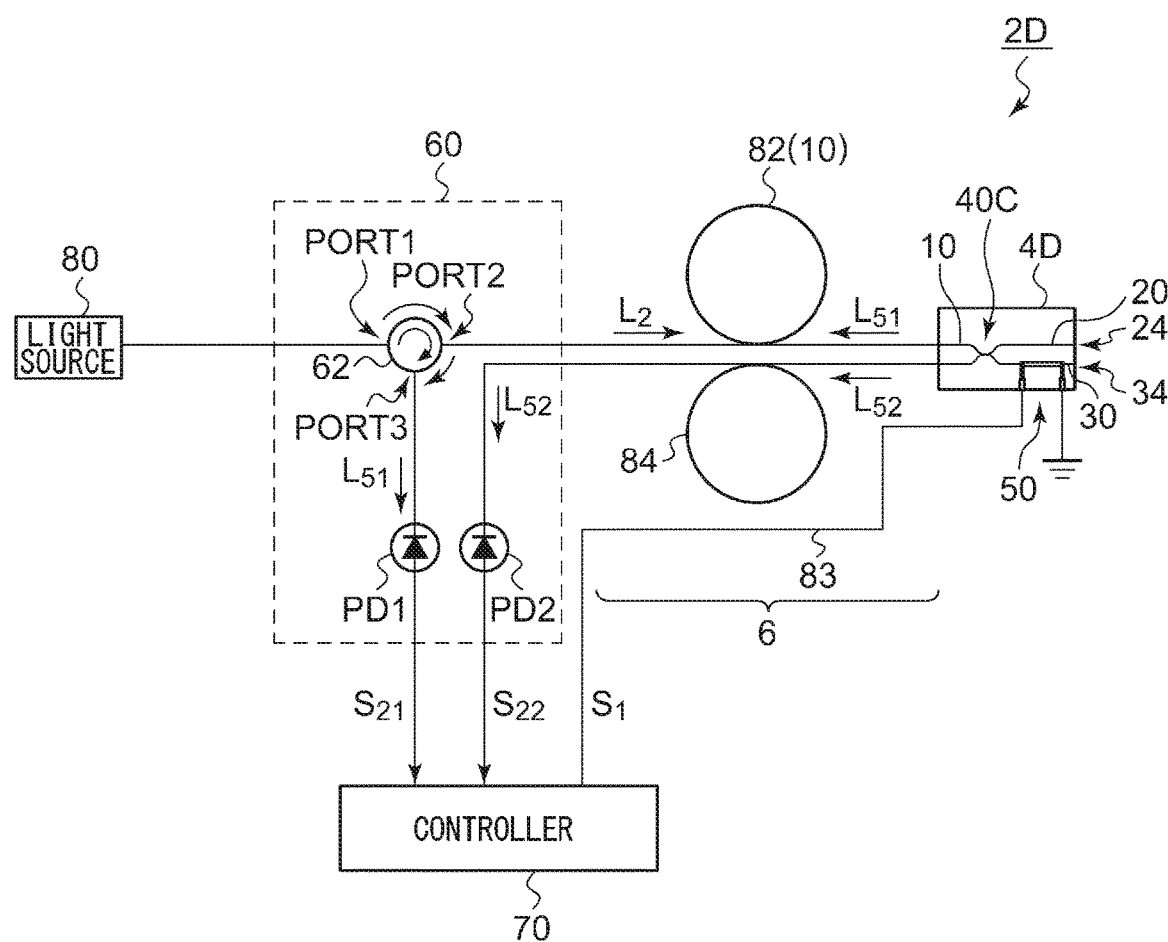
FIG. 10 is a diagram showing an illumination apparatus according to a fourth example.

FIG. 10 is a diagram showing an illumination apparatus 2D according to a fourth example. The fourth example can be regarded as a combination of the first example and the second example. An end portion 4D has the same configuration as that of the end portion 4C shown in FIG. 8A. A first return light beam $L_{51}$ is input from the first input path of the splitter 40C to the optical fiber 82. A second return light beam $L_{52}$ is input from the second input path of the splitter 40C to the optical fiber 84.

The phase detector 60 includes a return light beam splitter unit 62, the first photodetector PD1, and the second photodetector PD2. The first photodetector PD1 measures the intensity of the first return light beam $L_{51}$ output from the third port PORT3 of the return light beam splitter unit 62, and generates a detection signal $S_{21}$ that indicates the intensity thus measured. The second photodetector PD2 measures the intensity of the second return light beam $L_{52}$, and generates a detection signal $S_{22}$ that indicates the intensity thus measured. The controller 70 detects the phase difference $\Delta\phi$ based on the output $S_{21}$ of the first photodetector PD1 and the output $S_{22}$ of the second photodetector PD2.

Figure 11:
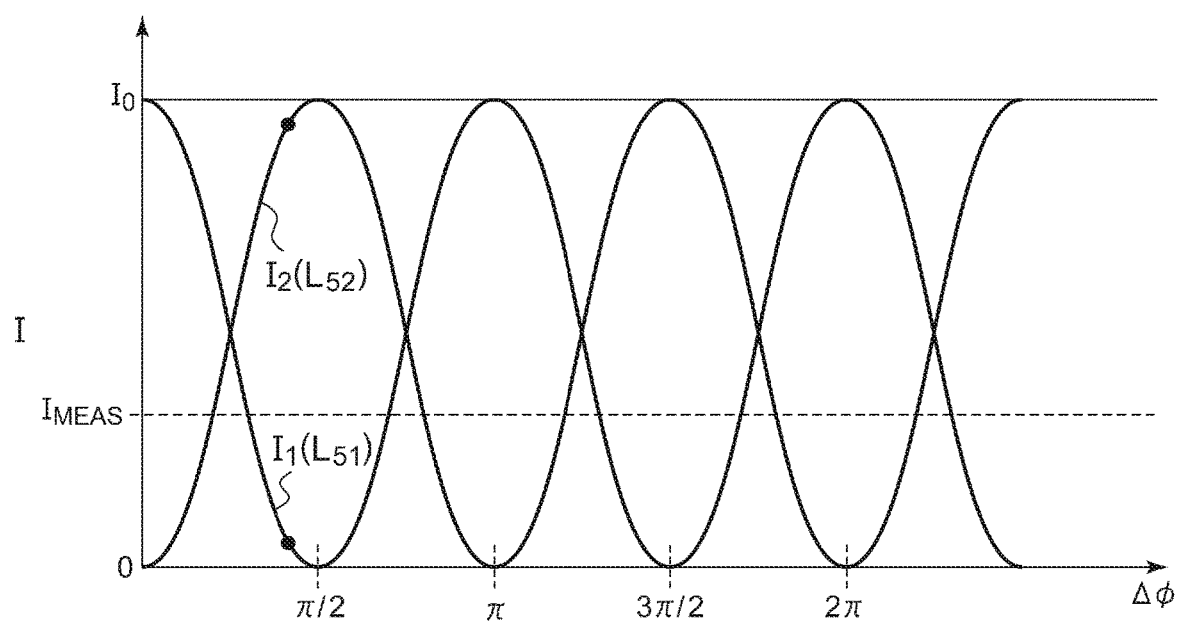
FIG. 11 is a diagram showing the relation between the phase difference $\Delta\phi$ and two return light beams in the illumination apparatus shown in FIG. 10.

The above is the configuration of the illumination apparatus 2D. Next, description will be made regarding the operation thereof. FIG. 11 is a diagram showing the relation between the phase difference $\Delta\phi$ and the two return light beams $L_{51}$ and $L_{52}$ in the illumination apparatus 2D shown in FIG. 10. The two return light beams $L_{51}$ and $L_{52}$ have a complementary relation in which bright and dark are inverted with respect to the phase difference $\Delta\phi$. Accordingly, by selecting a large value from among the intensities $I_1$ and $I_2$ of the return light beams $L_{51}$ and $L_{52}$ according to the phase difference $\Delta\phi$ value, this arrangement provides an improved S/N ratio.

The sum total $(I_1+I_2)$ of the two intensities $I_1$ and $I_2$ is constant, which exhibits a peak intensity $I_0$. Accordingly, the controller 70 may calculate the peak intensity $I_0$ based on the sum total of the two intensities $I_1$ and $I_2$. More preferably, the two intensities $I_1$ and $I_2$ may each be divided by $(I_1+I_2)$ so as to normalize the two intensities $I_1$ and $I_2$. The normalized values $A_1$ and $A_2$ are represented by the following Expressions.

$$A_1 = I_1/(I_1+I_2) = \cos^2(\Delta\phi) \tag{3a}$$

$$A_2 = I_1/(I_1+I_2) = 1 - \cos^2(\Delta\phi) \tag{3b}$$

The controller 70 selects a larger value from among $A_1$ and $A_2$ so as to calculate $\Delta\phi$ based on the corresponding one selected from among Expressions (3a) and (3b). By employing such a normalized value, this arrangement is capable of removing the effect of the change in the peak intensity $I_0$ that occurs due to the bent optical fiber.

In a case in which two photodetectors are employed as in the fourth example, and in a case in which the intensities ($I_1$, $I_2$) measured by the two photodetectors each contain an offset component, the following processing may preferably be supported.

$$I_1 = I_{01} \cdot \cos^2(\Delta\phi) + I_{DC1}$$

$$I_2 = I_{02} \cdot \cos^2(\Delta\phi) + I_{DC2}$$

The maximum value $I_{MAX1}$ and the minimum value $I_{MIN1}$ are acquired for the intensity $I_1$. Furthermore, $I_{MIN1}$ is employed as $I_{DC1}$, and $(I_{MAX1} - I_{MIN1})$ is employed as $I_{01}$. Similarly, the maximum value $I_{MAX2}$ and the minimum value $I_{MIN2}$ are acquired for the intensity $I_2$. Furthermore, $I_{MIN2}$ is employed as $I_{DC2}$, and $(I_{MAX2} - I_{MIN2})$ is employed as 102.

Subsequently, the normalized values $A_1$ and $A_2$ may be calculated based on the following relation Expressions.

$$A_1 = I_{01}/(I_{01}+I_{02}) = \cos^2(\Delta\phi) \tag{3a'}$$

$$A_2 = I_{02}/(I_{01}+I_{02}) = 1 - \cos^2(\Delta\phi) \tag{3b'}$$

FIFTH EXAMPLE

Figure 12A:
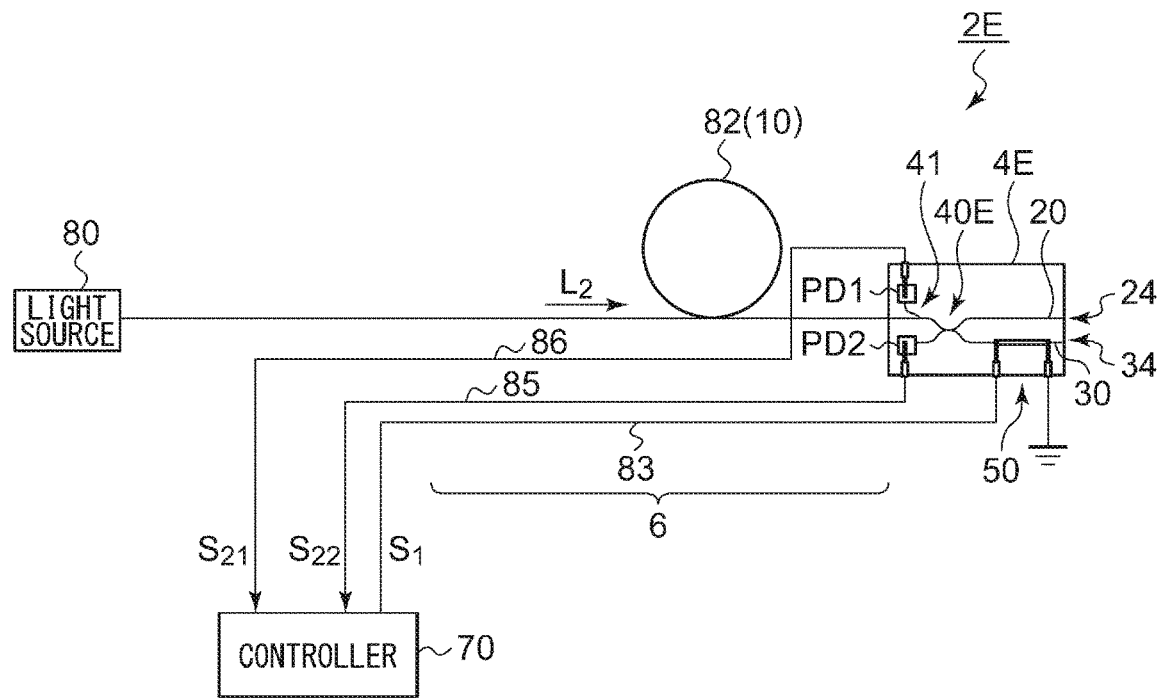
FIGS. 12A ands 12B are diagrams showing an illumination apparatus according to a fifth example.
Figure 12B:
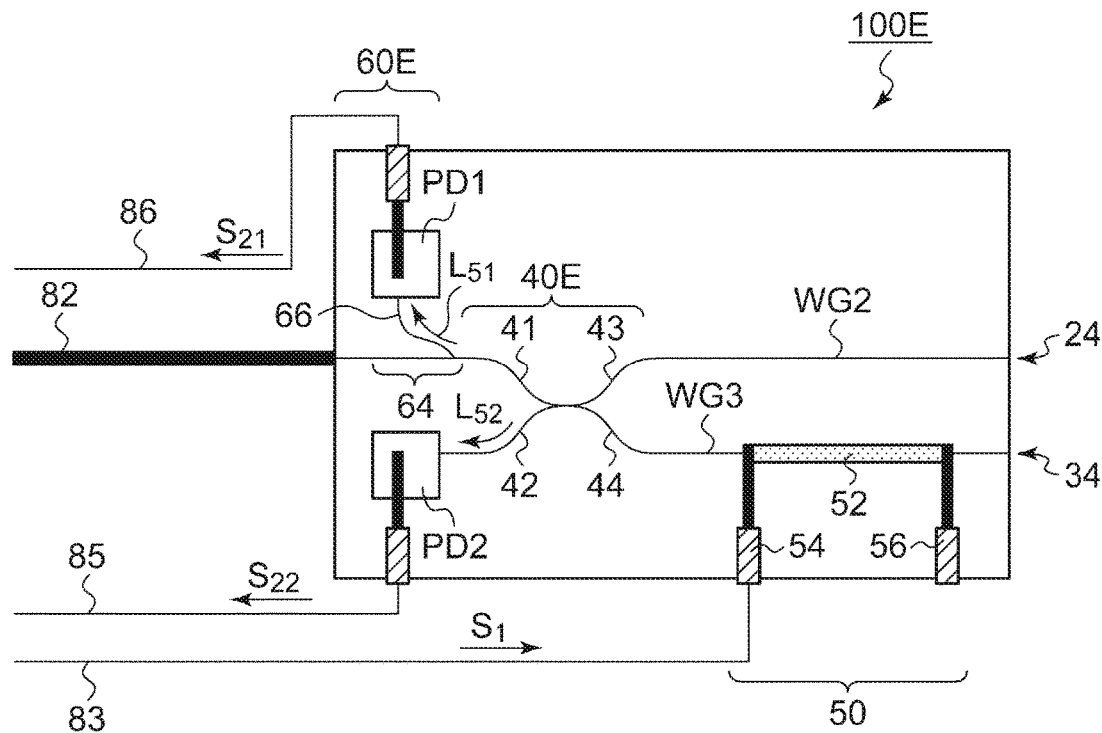

FIGS. 12A and 12B are diagrams showing an illumination apparatus 2E according to a fifth example. As shown in FIG. 12A, in the fifth example, the two photodetectors PD1 and PD2 that detect the two return light beams $L_{51}$ and $L_{52}$ are employed as in the fifth example. In the fifth example, the two photodetectors PD1 and PD2 are provided to an end portion 4E.

FIG. 12B is a plan view of an optical integrated circuit 100E according to the fifth example. A splitter 40E is configured as a (2×2) optical coupler in the same manner as the splitters 40B and 40C. A phase detector 60E includes the first photodetector PD1, the second photodetector PD2, and a sub-splitter 64 integrated on the optical integrated circuit 100E.

The sub-splitter 64 distributes the return light beam $L_{51}$ input via the first input path 41 of the (2×2) optical coupler (40E) to the light source side arm and the detection arm 66. The first photodetector PD1 measures the intensity of the light beam $L_{51}$ distributed to the detection arm 66. The second photodetector PD2 measures the intensity of the output light beam input via the second input path 42 as shown in FIG. 9B.

The outputs (detection signals) $S_{21}$ and $S_{22}$ respectively output from the first photodetector PD1 and the second photodetector PD2 are supplied to the controller 70 via electrical wiring 86 and 85. The controller 70 detects the phase difference $\Delta\phi$ based on the two detection signals $S_{21}$ and $S_{22}$.

The above is the configuration of the illumination apparatus 2E. With the illumination apparatus 2E, compared to the illumination apparatus 2D shown in FIG. 10, this arrangement allows the return light beam splitter unit 62 and the optical fiber 84 to be omitted.

In FIG. 10, the first photodetector PD1 may be built into the end portion 4D (optical integrated circuit 100), and the return light beam splitter unit 62 may be omitted.

SIXTH EXAMPLE

Figure 13A:
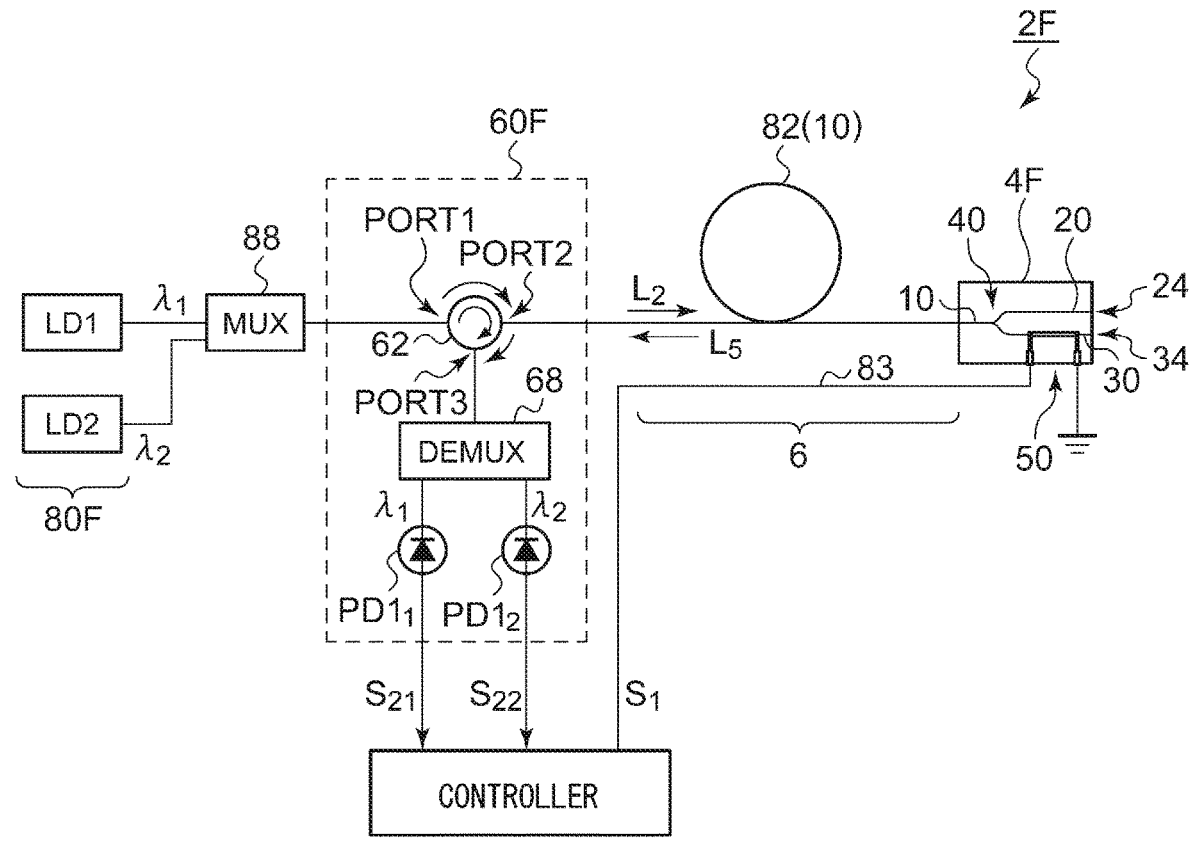
FIGS. 13A ands 13B are diagrams showing an illumination apparatus according to a sixth example.
Figure 13B:
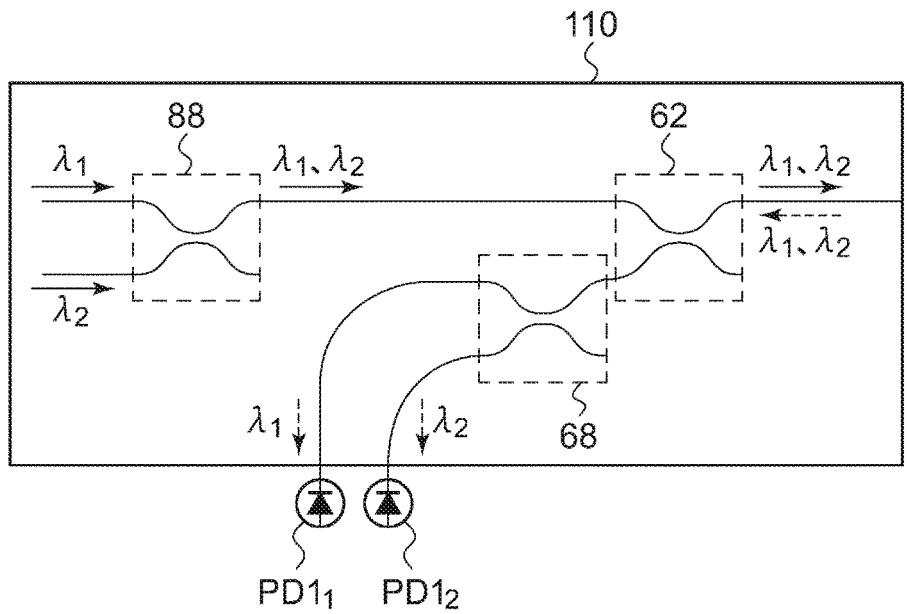

FIGS. 13A and 13B are diagrams showing an illumination apparatus 2F according to a sixth example. The illumination apparatus 2F can be regarded as a modification of the illumination apparatus 2A shown in FIG. 4 configured to support multiple wavelengths.

In addition to a light beam $\lambda_1$ to be used for generating an interference fringe, a light source 80F generates a light beam $\lambda_2$ having a different wavelength for phase difference detection. For example, the light source 80F may include two laser diodes that support different respective oscillation wavelengths, or otherwise may include a variable-wavelength laser. The light beams $\lambda_1$ and $\lambda_2$ having different wavelengths are multiplexed by a multiplexer 88. For example, the two wavelengths that can be employed include $\lambda_1 = 633$ nm and $\lambda_2 = 540$ nm.

A phase detector 60F includes a return light beam splitter unit 62, a demultiplexer 68, and two photodetectors $PD1_1$ and $PD1_2$. The demultiplexer 68 demultiplexes the return light beam $L_5$ into the light beams $\lambda_1$ and $\lambda_2$. The two photodetectors $PD1_1$ and $PD1_2$ detect the intensities of the light beams $\lambda_1$ and $\lambda_2$ having respective wavelengths.

Figure 14:
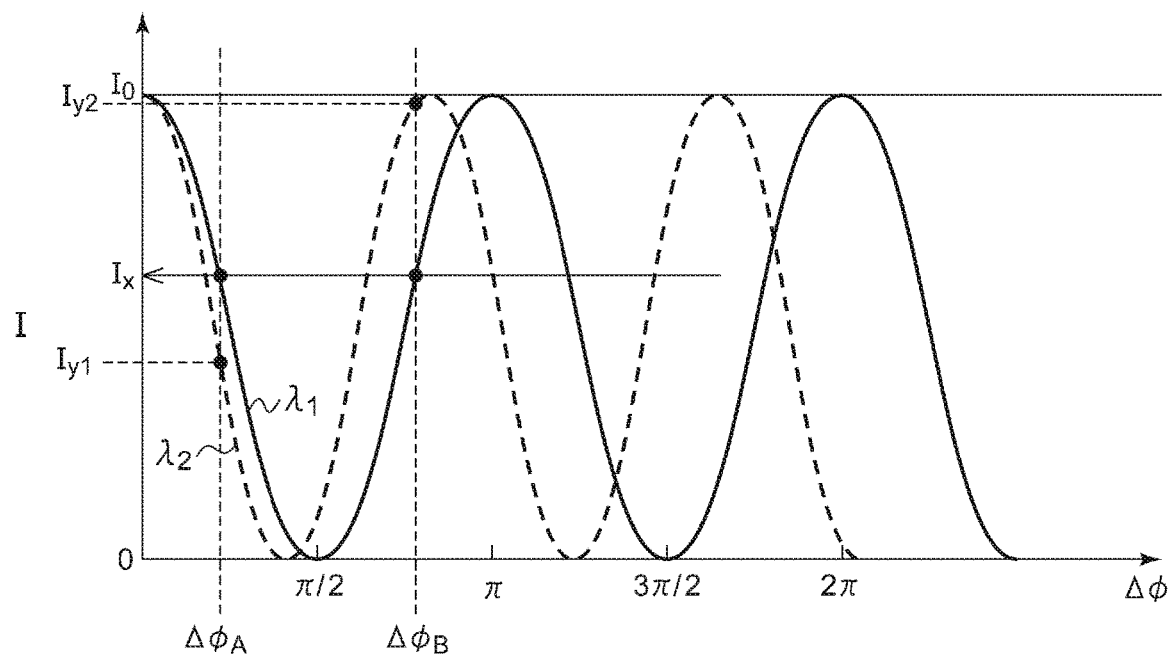
FIG. 14 is a diagram showing the relation between the phase difference $\Delta\phi$ and the intensity of the return light in the illumination apparatus shown in FIG. 13A.

The above is the configuration of the illumination apparatus 2F. Next, description will be made regarding the operation thereof. FIG. 14 is a diagram showing the relation between the phase difference $\Delta\phi$ and the intensity of the return light beam in the illumination apparatus 2E shown in FIG. 13A. When a given control signal $S_1$ is supplied, the phase difference $\Delta\phi$ provided by the two output arms 20 and 30 changes for each wavelength. Description will be made below with the phase difference provided at the wavelength $\lambda_2$ as $\Delta\phi_2$ in order to distinguish it from the phase difference $\Delta\phi$ provided at the wavelength $\lambda_1$ to be measured.

In a case of employing a single wavelength $\lambda_1$ as described above, there are multiple phase differences $\Delta\phi_A$ and $\Delta\phi_B$ that provide the same intensity $I_X$.

In the fifth example, by measuring a pair of the intensities $I_x$ and $I_y$ of the return light beam $L_5$ with respect to the multiple wavelengths $\lambda_1$ and $\lambda_2$, this arrangement is capable of acquiring the correct phase difference $\Delta\phi$. The magnitude relation between $\Delta\phi_1$ and $\Delta\phi_2$ changes for every predetermined region of the phase difference $\Delta\phi$ (control signal $S_1$). In the example shown in FIG. 14, when the intensity at the wavelength $\lambda_2$ is $I_{y1}$, $\Delta\phi_A$ is selected as the correct phase difference for the wavelength $\lambda_1$. When the intensity at the wavelength $\lambda_2$ is $I_{y2}$, $\Delta\phi_B$ is selected as the correct phase difference for the wavelength $\lambda_1$. As described above, by measuring the intensities at multiple different wavelengths, this arrangement is capable of detecting the correct phase $\Delta\phi_1$.

Figure 15A:
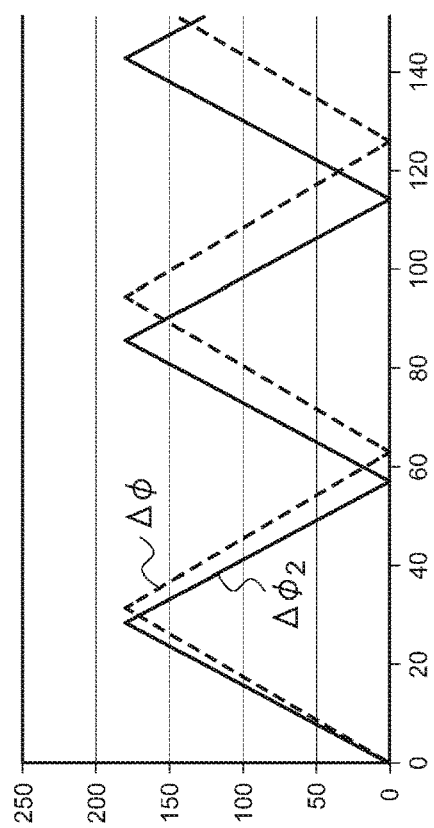
FIGS. 15A through 15D are diagrams showing a method for calculating the phase difference.
Figure 15B:
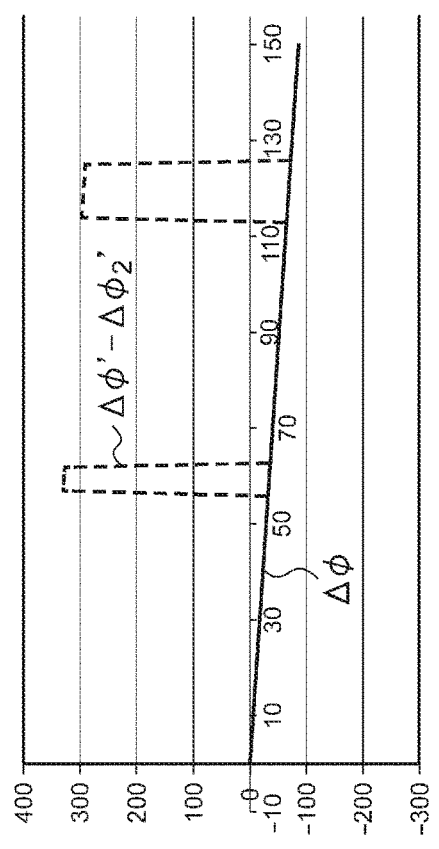

More specifically, the phase difference $\Delta\phi$ can be calculated according to the following procedure. FIG. 15A through 15D are diagrams showing a method for calculating the phase difference. In FIGS. 15A through 15D, the phase difference is represented in units of degrees. FIG. 15A shows the detection intensity $I_x$ detected by the photodetector $PD1_1$ and the detection intensity $I_y$ detected by the photodetector $PD1_2$. The phase difference $\Delta\phi$ is calculated from $I_x$, and the phase difference $\Delta\phi_2$ is calculated from $I_y$, using Expression (2A) or (2B). (FIG. 15B).

Figure 15C:
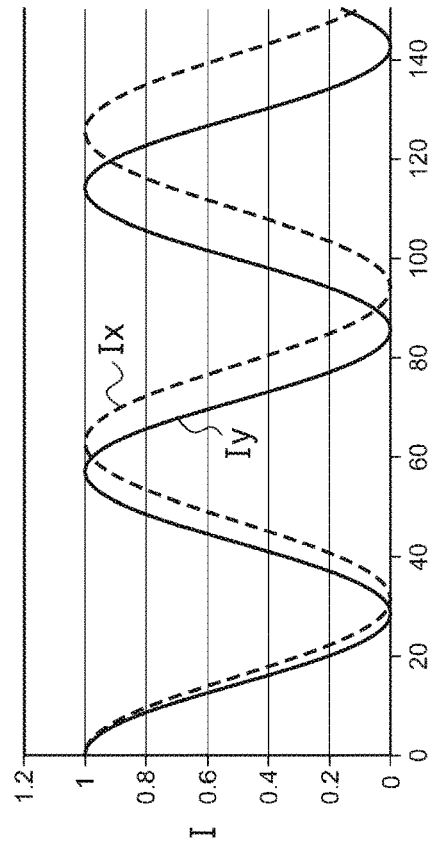
Figure 15D:
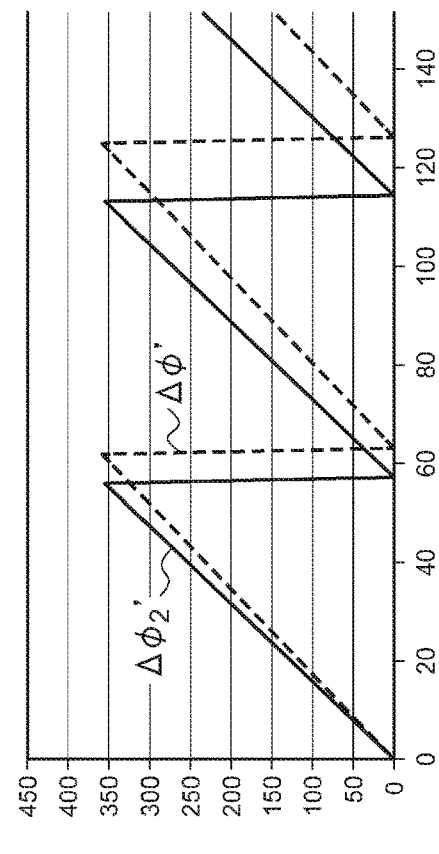

Subsequently, the curves of the phase differences $\Delta\phi$ and $\Delta\phi_2$ are each inverted for a region in which it has a negative slope, which provides $\Delta\phi'$ and $\Delta\phi_2'$ (FIG. 15C). Subsequently, $(\Delta\phi'-\Delta\phi_2')$ is calculated. By normalizing $(\Delta\phi'-\Delta\phi_2')$ such that it is within a region that is smaller than 0, this arrangement provides the phase difference $\Delta\phi$ to be obtained.

The above is the operation of the fifth example. The fifth example is capable of providing an extended phase difference detection range up to a range supported by an arrangement employing the wavelength $\lambda=\lambda_1\cdot\lambda_2/(\lambda_1-\lambda_2)$ that corresponds to the beat of the two wavelengths $\lambda_1$ and $\lambda_2$.

SIXTH EXAMPLE

Figure 16:
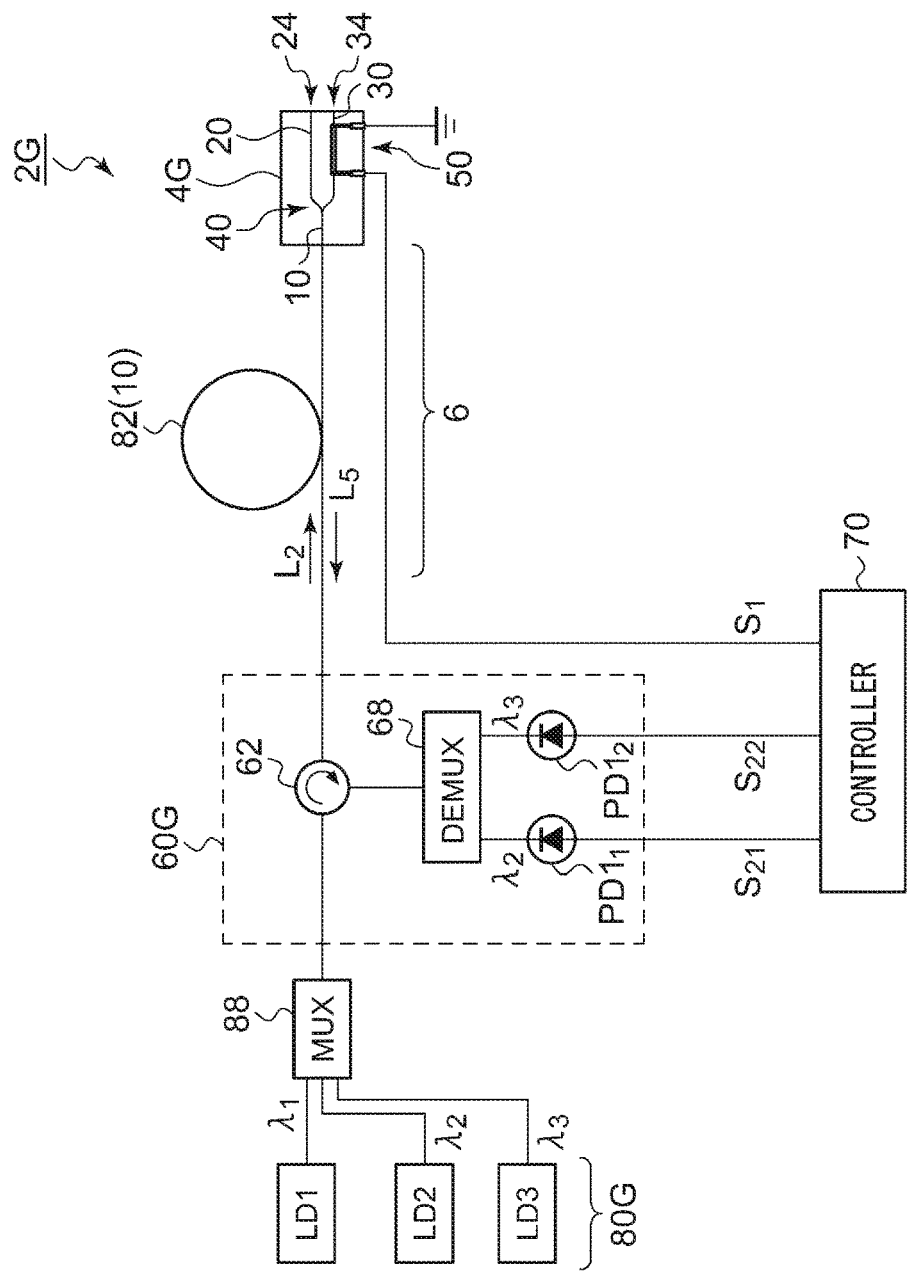
FIG. 16 is a diagram showing an illumination apparatus according to a sixth example.

FIG. 16 is a diagram showing an illumination apparatus 2G according to a sixth example. The illumination apparatus 2G can be regarded as a modification of the fifth example. A light source 80G generates light beams $\lambda_1$ through $\lambda_3$ of three wavelengths. The light beam $\lambda_1$ is employed to generate an interference fringe. The light beams $\lambda_2$ and $\lambda_3$ are each employed to detect the phase. That is to say, in phase detection, the two light beams $\lambda_2$ and $\lambda_3$ correspond to the light beams $\lambda_1$ and $\lambda_2$ in the fifth example. The multiplexer 88 multiplexes the light beams $\lambda_1$ through $\lambda_3$ of the three wavelengths. The input light beam $L_2$ including the three wavelengths is input to an end portion 4G after it propagates through the optical fiber 82.

In the end portion 4G, the output end 24 of the first output arm 20 and the output end 34 of the second output arm 30 are each provided with a wavelength filter coating so as to allow the light beam $\lambda_1$ to pass through while reflecting the light beams $\lambda_2$ and $\lambda_3$. With this arrangement, the light beam $\lambda_1$ is emitted in a space so as to generate an interference fringe. Furthermore, the light beams $\lambda_2$ and $\lambda_3$ are reflected by the output ends 24 and 34, and are input to the phase detector 60G as the return light beam $L_5$.

The phase detector 60G has the same configuration as that of the phase detector 60F shown in FIG. 13A. The demultiplexer 68 demultiplexes the return light beam $L_5$ into the light beams with wavelengths $\lambda_2$ and $\lambda_3$.

The controller 70 detects the phase difference based on the outputs of the photodetectors $PD1_1$ and $PD1_2$. The phase detection method is the same as described in the fifth example.

With the sixth example, this arrangement is capable of detecting the phase difference between the two output arms 20 and 30 using the two light beams $\lambda_2$ and $\lambda_3$ while generating the interference fringe using the light beam $\lambda_1$.

Furthermore, the light beam $\lambda_1$ with the wavelength to be used to generate the interference fringe is not required to be used to detect the phase difference. Accordingly, this arrangement provides improved irradiation efficiency. Furthermore, the light beams $\lambda_2$ and $\lambda_3$ are used to detect the phase difference. Accordingly, such an arrangement provides improved detection sensitivity compared to an arrangement using a part of the light beam $\lambda_1$ for phase difference detection.

SEVENTH EXAMPLE

Figure 17:
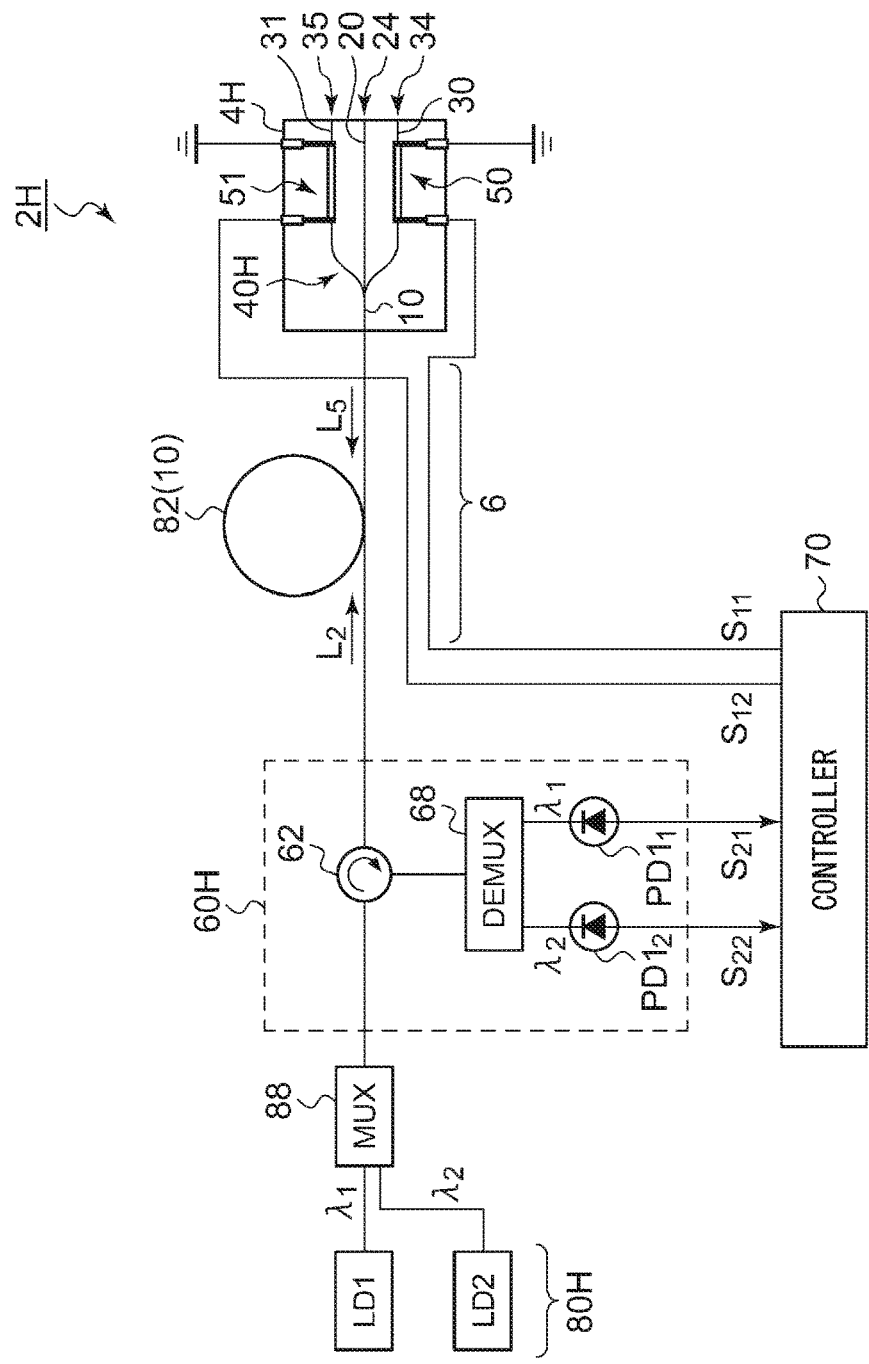
FIG. 17 is a diagram showing an illumination apparatus according to a seventh example.

FIG. 17 is a diagram showing an illumination apparatus 2H according to a seventh example. Description has been made in the above examples regarding an arrangement in which the light beam is split into two light beams at the end portion 4G. In contrast, in the seventh example, the light beam is split to three light beams. The illumination apparatus 2H has the same configuration as that of the illumination apparatus 2G shown in FIG. 16 except for the end portion 4G.

Description will be made regarding an end portion 4H. In the end portion 4H, the light beam input to the input arm 10 is split into the first output arm 20, the second output arm 30, and a third output arm 31. Accordingly, the end portion 4H is provided with a three-branch splitter 40H. The phase modulator 50 changes the optical path length of the second output arm 30 according to a control signal $S_{11}$ received from the controller 70. A phase modulator 51 changes the optical path length of the third output arm 31 according to a control signal $S_{12}$.

The output ends of the end portion 4H are provided with wavelength filter coating. The output end 24 of the first output arm 20 allows a part of the light beam $\lambda_1$ and a part of the light beam $\lambda_2$ to pass through while reflecting another part of them. The output end 34 of the second output arm 30 allows all the light beam $\lambda_1$ and a part of the light beam $\lambda_2$ to pass through while reflecting another part of the light beam $\lambda_2$. An output end 35 of the third output arm 31 allows all the light beam $\lambda_2$ and a part of the light beam $\lambda_1$ to pass through while reflecting another part of the light beam $\lambda_1$.

The above is the configuration of the illumination apparatus 2H. Next, description will be made regarding the operation thereof.

The wavelength $\lambda_1$ component contained in the return light beam $L_5$ indicates the phase difference between the pair of the first output arm 20 and the third output arm 31. Accordingly, this arrangement is capable of detecting the phase difference between the pair of the first output arm 20 and the third output arm 31 based on the output of the photodetector $PD1_1$.

The wavelength $\lambda_2$ component contained in the return light beam $L_5$ indicates the phase difference between the pair of the first output arm 20 and the second output arm 30. Accordingly, this arrangement is capable of detecting the phase difference between the pair of the first output arm 20 and the second output arm 30 based on the output of the photodetector $PD1_2$.

With the seventh example, this arrangement allows the phase differences between different optical path (output arm) pairs to be detected. By increasing the number of the wavelengths, this allows the phase difference to be detected for three or more output arms.

EIGHTH EXAMPLE

Figure 18:
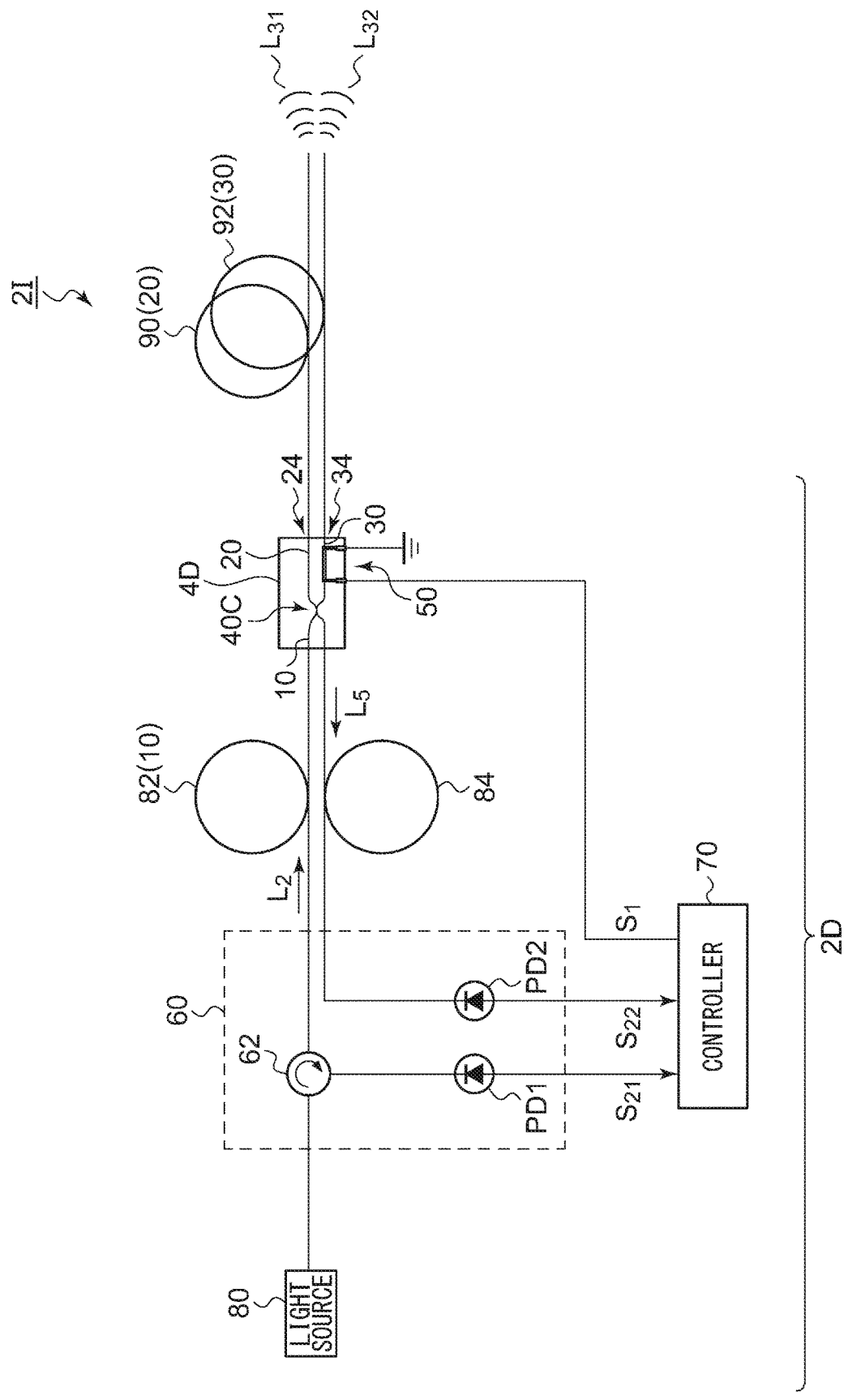
FIG. 18 is a diagram showing an illumination apparatus according to an eighth example.

FIG. 18 is a diagram showing an illumination apparatus 2I according to an eighth example. The illumination apparatus 2I can be regarded as a modification of the illumination apparatus 2D (fourth example) shown in FIG. 10. In addition to the configuration of the illumination apparatus 2D, the illumination apparatus 2I includes optical fibers 90 and 92. The optical fiber 90 is coupled to the output end 24 of the waveguide (WG2) of the end portion 4D, and forms the first output arm 20 together with the waveguide (WG2) of the end portion 4D. Similarly, the optical fiber 92 is coupled to the output end 34 of the waveguide (WG3) of the end portion 4D, and forms the second output arm 30 together with the waveguide (WG3) of the end portion 4D. It should be noted that the optical fibers 90 and 92 may be configured as a multi-core optical fiber.

With the eighth example, this arrangement is capable of detecting the overall phase difference between the output arms 20 and 30 including the optical fibers 90 and 92. Furthermore, the ends of the optical fibers 90 and 92 function as a light emitting portion that emits light in the space. This allows the illumination apparatus to have a compact size. Furthermore, this provides an improved degree of layout design freedom.

It should be noted that other examples may be provided with the optical fibers 90 and 92 as additional components as in the eighth example.

What is claimed is:

1. An illumination apparatus structured to generate an interference fringe, comprising:
   an input arm structured to receive an input light beam from a light source;
   a first output arm;
   a second output arm;
   a splitter structured to split the input light beam that has passed through the input arm into the first output arm and the second output arm;
   a phase modulator structured to change a phase difference between output light beams respectively output from the first output arm and the second output arm; and
   a phase detector structured to detect the phase difference between the output light beams respectively output from the first output arm and the second output arm based on a return light beam obtained by combining a first reflected light beam reflected by an end of the first output arm and a second reflected light beam reflected by an end of the second output arm.

2. The illumination apparatus according to claim 1, wherein the phase detector comprises:
   a return light beam splitter unit comprising a first port coupled to the light source, a second port coupled to the input arm, and a third port structured to output an input light beam from the input arm to the second port; and
   a first photodetector structured to measure an intensity of an output light beam received from the third port.

3. The illumination apparatus according to claim 1, wherein the splitter comprises: a (2×2) optical coupler comprising a first input path coupled to the input arm, a second input path, a first output path coupled to the first output arm, and a second output path coupled to the second output arm,
   and wherein the phase detector comprises a second photodetector structured to measure an intensity of a return light beam received from the second input path.

4. The illumination apparatus according to claim 2, wherein the splitter comprises: a (2×2) optical coupler comprising a first input path coupled to the input arm, a second input path, a first output path coupled to the first output arm, and a second output path coupled to the second output arm,
   and wherein the phase detector further comprises a second photodetector structured to measure an intensity of a return light beam received from the second input path, and structured to detect the phase difference based on an output of the first photodetector and an output of the second photodetector.

5. The illumination apparatus according to claim 3, wherein the phase detector further comprises:
   a sub-splitter structured to distribute a return light beam from the first input path of the (2×2) optical coupler to an arm on the light source side and a detection arm; and
   a first photodetector structured to measure an intensity of a light beam distributed to the detection arm,
   and wherein the phase difference is detected based on an output of the first photodetector and an output of the second photodetector.

6. The illumination apparatus according to claim 1, wherein the light source is structured to generate a plurality of input light beams having different wavelengths,
   wherein the phase detector comprises:
   a demultiplexer structured to split the return light beam into multiple paths that correspond to the multiple wavelengths; and
   a plurality of photodetectors each structured to measure an intensity of a light beam split for each wavelength by the demultiplexer,
   and wherein the phase difference is detected based on outputs of the plurality of photodetectors.

* * * * *